United States Patent
Young et al.

(10) Patent No.: US 7,428,919 B2
(45) Date of Patent: Sep. 30, 2008

(54) METHOD AND SYSTEM FOR EVALUATING FLUID FLOW THROUGH A HEAT EXCHANGER

(76) Inventors: David P. Young, 31894 Merton Ave., Farmington Hills, MI (US) 48334; John Allen Coates, 3954 Berkshire, Warren, MI (US) 48091; James D. Snow, 102 Hamilton La., Tullahoma, TN (US) 37388

( * ) Notice: Subject to any disclaimer, the term of this patent is extended or adjusted under 35 U.S.C. 154(b) by 728 days.

(21) Appl. No.: 10/909,781

(22) Filed: Aug. 2, 2004

(65) Prior Publication Data

US 2006/0021739 A1   Feb. 2, 2006

(51) Int. Cl.
  B60H 1/00  (2006.01)
  G01K 17/06 (2006.01)
  F25B 29/00 (2006.01)
(52) U.S. Cl. ............... 165/11.1; 165/201; 374/40
(58) Field of Classification Search ............ 374/39–40, 374/141, 147; 702/51; 165/11.1, 11.2, 201, 165/104.33, 70
  See application file for complete search history.

(56) References Cited

U.S. PATENT DOCUMENTS

| | | | |
|---|---|---|---|
| 4,712,612 A | | 12/1987 | Okamoto et al. |
| 5,191,215 A | * | 3/1993 | McClelland et al. ..... 250/341.6 |
| D369,039 S | | 4/1996 | Guccione .................... D6/466 |
| 5,528,901 A | * | 6/1996 | Willis .......................... 60/626 |
| 5,652,964 A | | 8/1997 | Reinheardt ..................... 2/424 |
| D393,557 S | | 4/1998 | Guccione .................... D6/553 |
| 5,910,167 A | * | 6/1999 | Reinke et al. ................ 62/525 |
| 6,025,026 A | | 2/2000 | Smith et al. ................. 427/316 |
| D427,456 S | | 7/2000 | Guccione .................... D6/467 |
| 6,516,486 B1 | | 2/2003 | Mehendale et al. |
| 6,547,390 B1 | | 4/2003 | Bernheim et al. .......... 351/163 |
| 6,562,466 B2 | | 5/2003 | Jiang et al. ................. 428/412 |
| 6,606,115 B1 | * | 8/2003 | Alicandro et al. .......... 348/164 |
| 2002/0053601 A1 | * | 5/2002 | Kamiya et al. ............. 236/49.3 |
| 2003/0017340 A1 | | 1/2003 | Jaing et al. ................. 428/412 |
| 2004/0003914 A1 | * | 1/2004 | Avila .......................... 165/11.1 |
| 2004/0008317 A1 | | 1/2004 | Jaing et al. .................... 351/41 |
| 2004/0021941 A1 | | 2/2004 | Iori et al. .................... 359/494 |
| 2004/0194880 A1 | | 10/2004 | Jiang et al. ................. 156/285 |
| 2004/0225482 A1 | * | 11/2004 | Vladimirov et al. ........... 703/2 |
| 2005/0043430 A1 | | 2/2005 | Weber et al. ................ 522/114 |
| 2005/0051295 A1 | * | 3/2005 | Yamanaka et al. ............ 165/63 |

* cited by examiner

Primary Examiner—Tho Duong
(74) Attorney, Agent, or Firm—Jordan M. Meschkow; Lowell W. Gresham; Charlene R. Jacobsen

(57) ABSTRACT

A heat exchanger evaluation system (84) includes a refrigeration subsystem (126) and a platform (94) in communication with the subsystem (126) for attachment of a heat exchanger (32). The system, (84) further includes a thermal imaging camera (168) and a monitor (100). A method (180) entails routing a fluid (38) through the heat exchanger (32) via the refrigeration subsystem (126). The camera (168) detects the temperature variation across the heat exchanger (32) as the fluid (38) flows through the heat exchanger, and provides successive thermal images representing the temperature variation responsive to the flow of the fluid (38). The thermal images are utilized to determine an efficacy of the flow through the heat exchanger (32). In particular, a determination can be made as to whether the flow deviates from a pre-determined flow path (79) of the fluid (38) through the heat exchanger.

8 Claims, 15 Drawing Sheets

METHOD AND SYSTEM FOR EVALUATING FLUID FLOW THROUGH A HEAT EXCHANGER

TECHNICAL FIELD OF THE INVENTION

The present invention relates to the field of heat exchangers. More specifically, the present invention relates to evaluating a flow of fluid through a heat exchanger.

BACKGROUND OF THE INVENTION

A heat exchanger is a device for moving heat from one fluid to another (i.e., from a warm or hot fluid to a cold or cooler one) without allowing the fluids to mix. A heat exchanger typically consists of a series of tubes in which one of the fluids runs. The second fluid runs over the tubes and is heated or cooled. Evaporators, condensers, radiators, and the like are heat exchangers. For example, refrigeration systems, i.e., air conditioners, typically include two heat exchangers, usually referred to as the evaporator and the condenser.

FIG. 1 shows a simplified block diagram of an exemplary refrigeration system 20. Refrigeration system 20 includes a compressor 22 in fluid communication with a condenser 24 via a fluid line 26. Condenser 24 is in fluid communication with a metering device 28, which may be in the form of a restrictor or an expansion valve, via a fluid line 30. Metering device 28 is coupled with an evaporator 32 via a fluid line 34, and a fluid line 36 connects evaporator 32 to an input of compressor 22.

In operation, relatively high pressure refrigerant, denoted by arrows 38, is discharged in a gaseous form from compressor 22 via fluid line 26 to condenser 24. At condenser 24, refrigerant 38 is condensed by the action of a cooler fluid, such as air, flowing through condenser 24. The liquid refrigerant 38 thus formed flows via fluid line 30 to metering device 28. Metering device 28 controls the pressure and flow of refrigerant 38 into evaporator 32 in accordance with need. Refrigerant 38 passes into fluid line 34 and flows at relatively high velocity through fluid line 34 and into evaporator 32. Air, as denoted by an arrow 40, may be either blown or drawn through evaporator 32. As air 40 passes through evaporator 32, evaporator 32 removes heat (i.e., cools) air 40. The cooled air 40 is subsequently returned to the area to be cooled, for example, air 40 may be returned to a vehicle compartment. Warmed refrigerant 38 exits evaporator 32 and is returned via fluid line 36 to compressor 22 where the refrigeration cycle is continued.

To obtain the maximum heat transfer from air 40 to refrigerant 38, refrigerant 38 may be routed in evaporator 32 to make multiple passes through the air stream to be cooled, prior to being discharged from evaporator 32 for recirculation. Indeed, evaporators may be categorized in accordance with the number of times cold refrigerant 38 passes through the core portion of the evaporator, for example, a two-pass system, a three-pass system, and so forth.

FIG. 2 shows a perspective view of an exemplary configuration of evaporator 32. Evaporator 32 includes a refrigerant inlet 42, a refrigerant outlet 44, and a plurality of tube sheet assemblies 46 arranged in a stacked or back-to-back manner and brazed together to form the central portion, or core, of evaporator 32. Tube sheet assemblies 46 are operatively connected at their upper ends by an inlet conduit 48 and an outlet conduit 50 (each of which are shown in ghost form). Tube sheet assemblies 46 are further operatively connected at their lower ends by a first intermediate conduit 52 and a second intermediate conduit 54 (each of which are shown in ghost form). Conduits 48, 50, 52, and 54 will be discussed in greater detail below. Tube sheet assemblies 46 are arranged to define spaces 56 therebetween to accommodate fins 58. Fins 58 operate to increase the heat transfer performance of evaporator 32, as known to those skilled in the art.

Each of tube sheet assemblies 46 includes a pair of tube plates arranged in a face-to-face manner and brazed together about their periphery. A cavity (not shown) is formed between the brazed tube plates through which refrigerant 38 flows. Evaporator 32 includes two types of tube sheet assemblies 46, straight tube sheet assemblies 60 and U-turn tube sheet assemblies 62.

Referring to FIGS. 3-4 in connection with FIG. 2, FIG. 3 shows a planar view of a first tube plate 64 of one of straight tube sheet assemblies 60. FIG. 4 shows a planar view of a second tube plate 66 of one of U-turn tube sheet assemblies 62. It should be noted that one of straight tube sheet assemblies 60 is formed by a pair of first tube plates 64. Similarly, one of U-turn tube sheet assemblies 62 is formed by a pair of second tube plates 66. First and second tube plates 64 and 66, respectively, are provided to illustrate the intended flow of refrigerant 38 through their corresponding straight and U-turn tube sheet assemblies 60 and 62, respectively.

Referring particularly to FIG. 3, first tube plate 64 includes a first fluid flow section 68 in fluid communication with each of inlet conduit 48 and first intermediate conduit 52. First tube plate 64 further includes a second fluid flow section 70 in fluid communication with each of outlet conduit 50 and second intermediate conduit 54. A first dividing wall 72 separates first and second fluid flow sections 68 and 70, respectively. As such, when a pair of first tube plates 64 are brazed together, refrigerant 38 flowing in first fluid flow section 68 cannot mix with refrigerant 38 flowing in second fluid flow section 70.

Refrigerant 38 flows into first fluid flow section 68 of straight tube sheet assembly 60 from inlet conduit 48 and exits first fluid flow section 68 via first intermediate conduit 52. In contrast, refrigerant 38 flows into second fluid flow section 70 of straight tube sheet assembly 60 from second intermediate conduit 54 and exits via outlet conduit 50.

Referring now to FIG. 4, second tube plate 66 includes a third fluid flow section 74 in fluid communication with first intermediate conduit 52. Second tube plate 66 further includes a fourth fluid flow section 76 in fluid communication with second intermediate conduit 54. A second dividing wall 78 partially separates third and fourth fluid flow sections 74 and 76, respectively. In addition, a third dividing wall 80 separates third and fourth fluid flow sections 74 and 76 from inlet and outlet conduits 48 and 50, respectively. As such, when a pair of second tube plates 66 are brazed together, refrigerant 38 flows from third fluid flow section 74 into fourth fluid flow section 76. However, this refrigerant 38 cannot mix with refrigerant 38 flowing in inlet and outlet conduits 48 and 50.

Refrigerant 38 flows into third fluid flow section 74 of U-turn tube sheet assembly 62 from first intermediate conduit 52. Refrigerant 38 subsequently flows from third fluid flow section 74 into fourth fluid flow section 76, and exits fourth fluid flow section 76 via second intermediate conduit 54.

FIG. 5 shows a phantom schematic representation of evaporator 32 illustrating a pre-determined flow path 79 of refrigerant 38 from refrigerant inlet 42, through evaporator 32, to refrigerant outlet 44 of evaporator 32. As shown, refrigerant 38 enters evaporator 32 via refrigerant inlet 42, and flows in inlet conduit 48 to straight tube sheet assemblies 60. Refrigerant 38 flows through first fluid flow section 68 (FIG. 3) of each of straight tube sheet assemblies 60, where refrigerant 38 enters first intermediate conduit 52 (FIG. 2). Refrigerant 38 then flows through first intermediate conduit 52 to U-turn tube sheet assemblies 62, enters third fluid flow section 74 (FIG. 4), and flows into fourth fluid flow section 76 (FIG. 4). Refrigerant 38 subsequently flows out of U-turn tube sheet assemblies 62 into second intermediate conduit 54 (FIG. 2), and enters second fluid flow section 70 (FIG. 3) of straight tube sheet assemblies 60. Refrigerent 38 flows from second fluid flow section 70 into outlet conduit 50 (FIG. 2), where it exits evaporator 32 via refrigerant outlet 44.

Evaporator 32 represents a multiple pass flow through a central core 82 of straight and U-turn tube sheet assemblies 60 and 62, respectively. This multiple pass flow technique facilitates optimal cooling performance of evaporator 32. Unfortunately, the cooling performance of evaporator 32 may be compromised when a bypass situation occurs in core 82. The bypass situation occurs when the flow of refrigerant 38 deviates from its pre-determined flow path 79. That is, refrigerant 38 is able to bypass into another section of core 82, instead of being directed through evaporator 32 in the pre-determined, designed, or expected manner.

Internal leakage, or bypass, in a heat exchanger can be caused by a faulty manufacturing technique. For example, the incomplete brazing of first tube plates 64 (FIG. 3) that form straight tube sheet assemblies 60 and/or second tube plates 66 (FIG. 4) that form U-turn tube sheet assemblies 62, can result in defects in the internal bracing of core 82 that lead to the bypass situation. Some examples of bypass include, but are not limited to, leakage between first and second fluid flow sections 68 and 70 (FIG. 3), respectively, leakage between inlet and outlet conduits 48 and 50 (FIG. 2), respectively, leakage between first and second intermediate conduits 52 and 54 (FIG. 2), respectively, and so forth.

Some manufacturing facilities perform validation testing, or audit checks, to identify defective heat exchanger cores prior to their entry into the market. One such test attempts to identify internal leakage, or bypass, by measuring a quantity of heat rejection for a heat exchanger core and comparing that measured quantity of heat rejection with a desired heat rejection threshold. Unfortunately, such testing is complex, time consuming, and prone to error.

Obviously, it is highly desirable to prevent defective heat exchangers from entering the market. Moreover, as the complexity of heat exchanger increases, through more complex fluid flow paths such as heat exchanger 32, so too does the probability of internal leakage. Accordingly, what is needed is an efficient method and a cost effective system for inspecting heat exchangers for internal leakage.

SUMMARY OF THE INVENTION

Accordingly, it is an advantage of the present invention that a system and method for evaluating a flow of fluid through a heat exchanger are provided.

It is another advantage of the present invention that a system and method are provided that enable visualization of fluid flow through a heat exchanger.

Yet another advantage of the present invention is that the system and method enable the rapid, cost effective, and non-destructive evaluation of a heat exchanger for internal leakage.

The above and other advantages of the present invention are carried out in one form by a method for evaluating a flow of a fluid through a heat exchanger. The method calls for routing the fluid through the heat exchanger, detecting a surface temperature across the heat exchanger in response to a flow of the fluid through the heat exchanger, and determining an efficacy of the flow in response to the surface temperature.

The above and other advantages of the present invention are carried out in another form by a system for visualizing a flow of a fluid through a heat exchanger. The system includes a refrigerant subsystem for carrying the fluid, the refrigerant subsystem including a compressor and a condenser in communication via a fluid loop. A platform is configured for attachment of the heat exchanger, the platform having a fluid inlet and a fluid outlet in communication with the refrigerant subsystem, and the fluid inlet being configured for attachment with an inlet of the heat exchanger and the fluid outlet being configured for attachment with an outlet of the evaporator. The system further includes control means for selectively routing the fluid through the heat exchanger via the fluid loop, and a thermal imaging camera directed toward a sample location at the platform for detecting infrared radiation corresponding to surface temperature across the heat exchanger. A monitor is in communication with the thermal imaging camera, the monitor presenting thermal images responsive to a variation of the surface temperature of the heat exchanger.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 2:
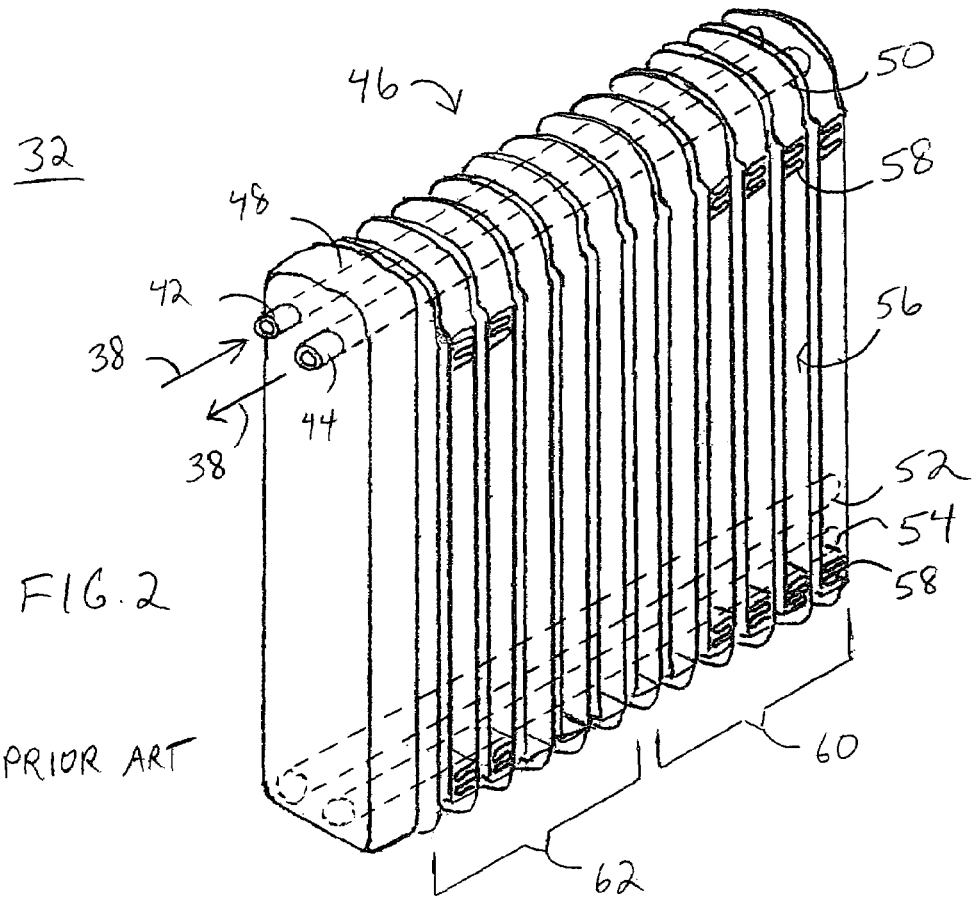
FIG. 2 shows a perspective view of an exemplary configuration of an evaporator of the refrigeration system.
Figure 3:
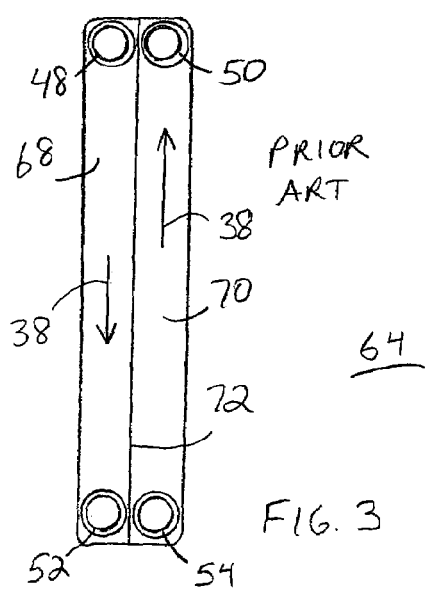
FIG. 3 shows a planar view of a first tube plate of a straight tube sheet assembly of the evaporator of FIG. 2.
Figure 4:
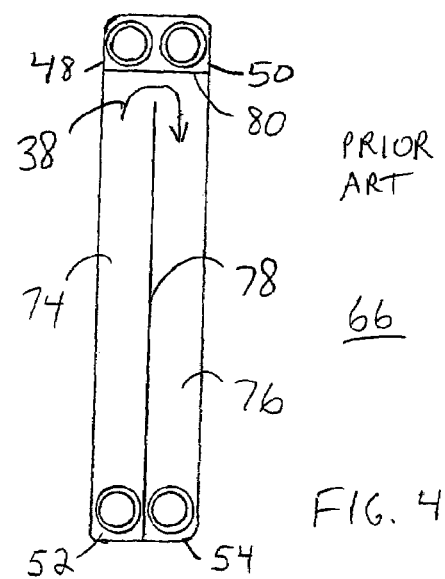
FIG. 4 shows a planar view of a second tube plate of a U-turn tube sheet assembly of the evaporator of FIG. 2.

The present invention involves a system and method for the post-manufacturing evaluation of heat exchangers. Such an evaluation can reveal internal leakage defects in heat exchangers. These defective heat exchangers can then be culled, or rejected, so that they do not enter the market. The present invention will be described in connection with its use for evaluating heat exchanger 32 (FIG. 2). However, it should be readily understood that the present invention may be adapted for testing any of a variety of multiple-pass heat exchangers.

Figure 6:
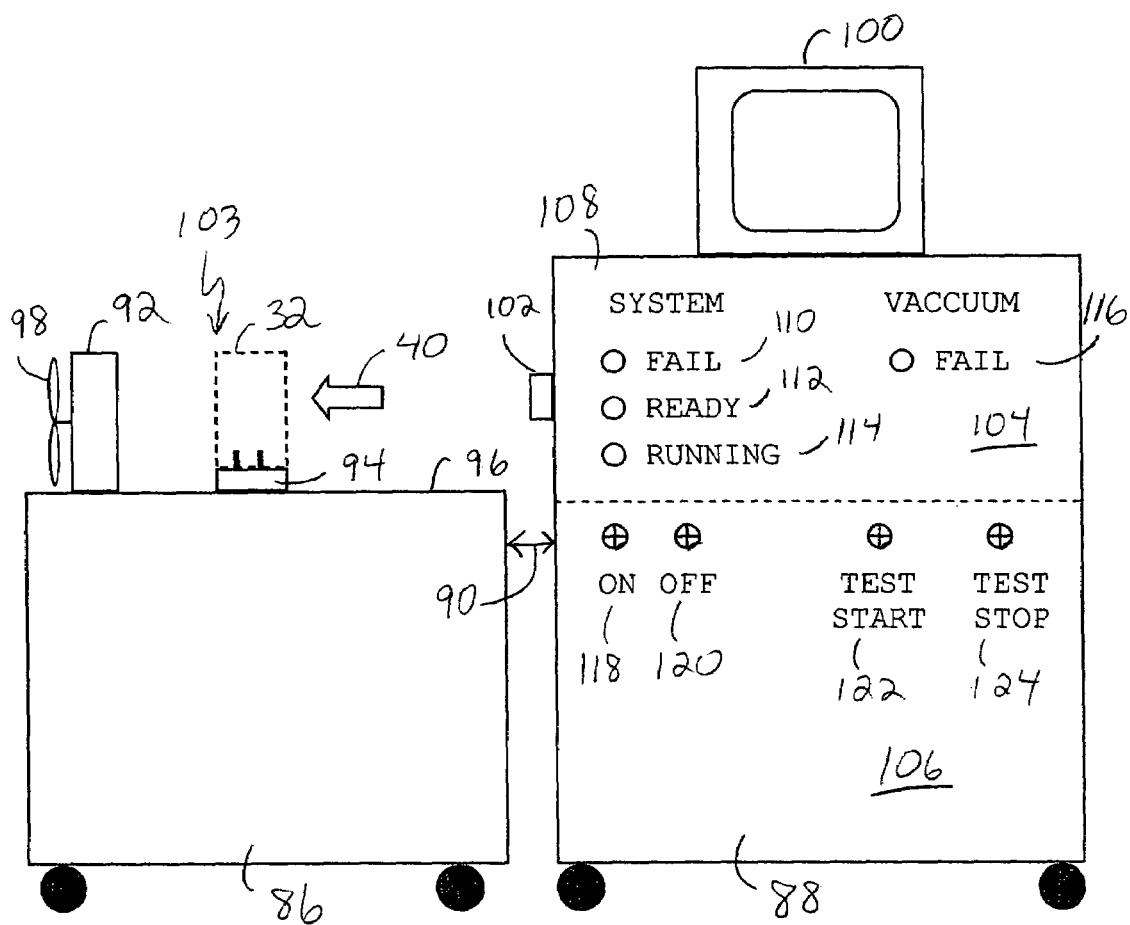
FIG. 6 shows a block diagram of a component layout of a heat exchanger evaluation system in accordance with a preferred embodiment of the present invention.

FIG. 6 shows a block diagram of a component layout of a heat exchanger evaluation system 84 in accordance with a preferred embodiment of the present invention. System 84 includes a mobile test station 86 and a mobile operator station 88. Test station 86 and operator station 88 may be coupled via a bi-directional communication link 90. Mobile test station 86 and mobile operator station 88 are wheeled vehicles, or carts, utilized to convey the components of heat exchanger evaluation system 84. However, stations 86 and 88 need not be wheeled vehicles, but may instead be one or more fixed structures that hold the components of heat exchanger evaluation system 84.

In this exemplary configuration, test station 86 includes a condenser 92 and a platform 94 positioned on an outer top surface 96 of test station 86. Platform 94 is configured for attachment of a heat exchanger, for example, evaporator 32 (FIG. 2). In addition, condenser 92 and platform 94 are aligned in spaced-relation with one another. Thus, a condenser fan 98 of condenser 92 can be utilized to draw ambient air 40 across heat exchanger 32 toward condenser 92.

Operator station 88 includes a monitor 100, a camera lens 102 directed toward a sample location 103 at platform 94, indicators 104, and operator controlled actuators 106 positioned about an outer surface 108 of operator station 88. Indicators 104 may be lights that are illuminated or extinguished in response to various operating configurations of system 84. Indicators 104 include, for example, a "system fail" indicator 110, a "system ready" indicator 112, a "system running" indicator 114, and a "vacuum leak" indicator 116. Actuators 106 include, for example, a "system on" pushbutton 118, a "system off" pushbutton 120, a "test start" pushbutton 122, and a "test stop" pushbutton 124. The remaining components of test station 86 and operator station 88 and the function of each will be described below.

Figure 7:
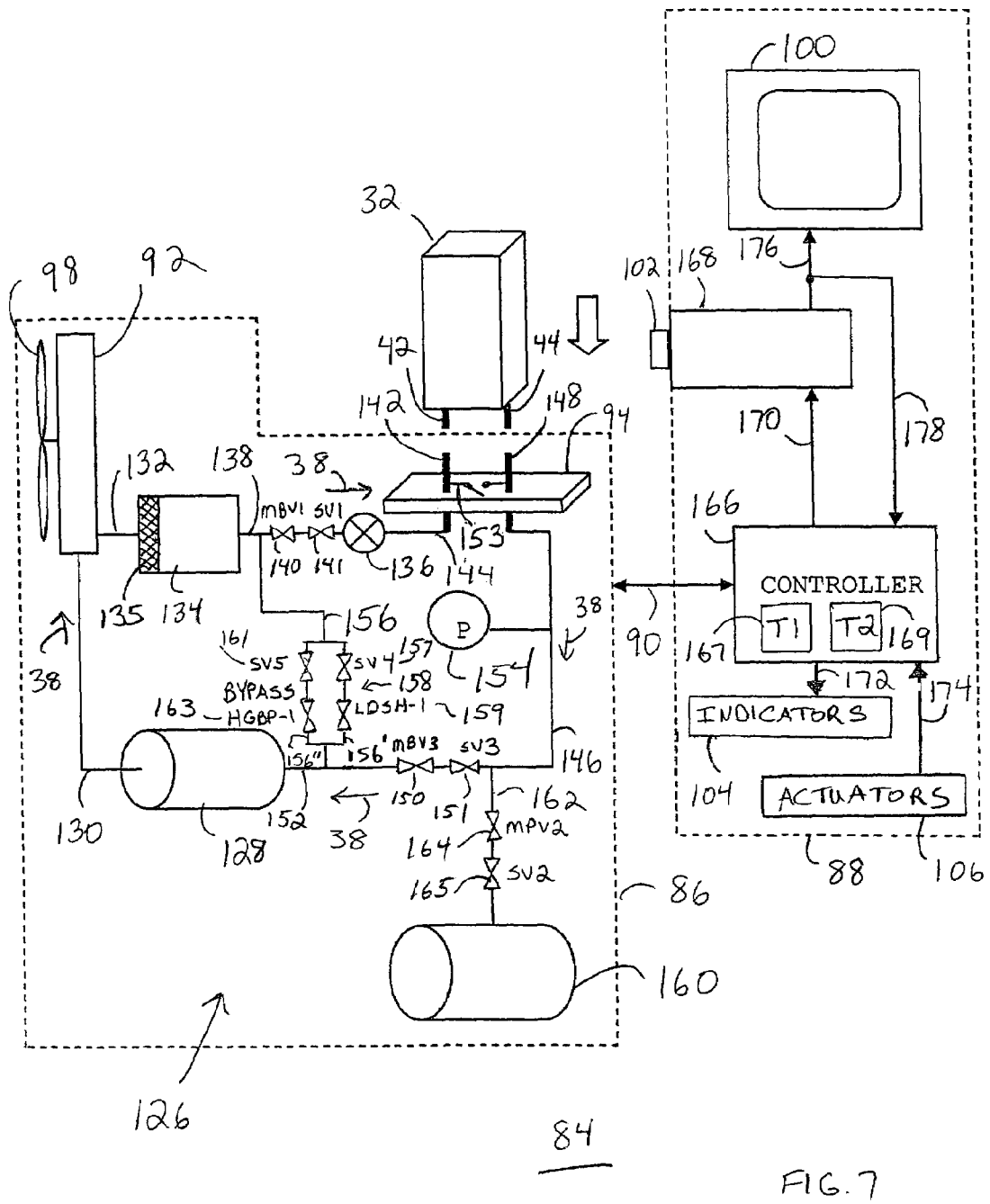
FIG. 7 shows a block diagram of a functional configuration of the heat exchanger evaluation system of FIG. 6.

FIG. 7 shows a block diagram of a functional configuration of heat exchanger evaluation system 84. Dashed lines delineate those components that form test station 86 and those components that form operator station 88. In general, test station 86 includes a closed loop refrigeration subsystem 126 into which evaporator 32 can be installed and evaluated. Whereas, operator station 88 includes the appropriate control and data collection mechanisms with which an operator may evaluate evaporator 32.

Refrigeration subsystem 126 includes a compressor 128 in fluid communication with condenser 92 via a first fluid loop section 130. A second fluid loop section 132 interconnects an outlet of condenser 92 with a receiver 134. Receiver 134 includes a filter 135 for filtering contaminants from refrigerant 38 circulating within refrigeration subsystem 126. As such, refrigerant 38 will enter evaporator 32 free from contaminants that might otherwise compromise its performance prior to its entry into the market. Although only filter 135 is shown, receiver 134 may further include a desiccant for removing water from refrigerant. In addition, those skilled in the art will recognize that receiver 134 could be integrated into condenser 92 and/or that filter 135 may be integral to condenser 92.

Receiver 134 is in fluid communication with a metering device 136, such as an expansion valve, an orifice tube, and the like, via a third fluid loop section 138. A first valve 140, labeled "MBV1", is positioned in third fluid loop section 138 between receiver 134 and metering device 136. In addition, a first solenoid valve 141, labeled "SV1", is positioned in third fluid loop section 138 between first valve 140 and metering device 136. Although metering device 136 is shown as being interposed between first valve 140 and a first fluid port 142 of platform 94 along a fourth fluid loop section 144, metering device may alternatively be incorporated into platform 94.

In an exemplary embodiment, first valve (MBV1) 140 is a mechanical ball valve that opens when a first control signal is applied and closes when a second control signal is applied. First valve 140 is controlled to enable a flow of fluid 38 through third fluid loop section 138. First solenoid valve (SV1) 141 is normally held open through the application of a control signal, but closes in response to the loss of the control signal, which may occur during a power outage. The closure of first solenoid valve 141 enables test station 86 to be placed into a fail safe mode with all valves closed in response to a power outage.

The nomenclature "MBV" indicates the utilization of a mechanical ball valve for controlling the flow of fluid 38 through the fluid loop of test station 86. The nomenclature "SV" indicates the utilization of a solenoid valve for ensuring valve closure and the cessation of the flow of fluid 38 through the fluid loop of test station 86. This nomenclature applies to other valves discussed below. The pairing of a mechanical ball valve with a solenoid valve, as in first valve 140 with first solenoid valve 141, represents a compromise in which the ball valve is utilized to control fluid flow, but requires two signals (one to open and one to close) while the solenoid valve only requires one signal. Thus, the solenoid valve closes on loss of power, but not tightly enough to be used without the ball valve for controlling fluid flow. However, those skilled in the art will recognize that alternative valve configurations may be employed for selectively controlling the flow of fluid 38 that are also able to close on loss of power.

A fifth fluid loop section 146 interconnects a second fluid port 148 and a third valve 150, labeled "MBV3", with a third solenoid valve 151, labeled "SV3", interposed between them. A sixth fluid loop section 152 interconnects third valve, V3, 150 with compressor 128. Thus, first, second, third, fourth, fifth, and sixth fluid loop sections 130, 132, 138, 144, 146, and 152 form a closed fluid loop of refrigeration subsystem 126.

In a preferred embodiment, a safety mechanism, in the form of an interlock 153, is incorporated into platform 94. Interlock 153 is an electromechanical element that either prevents the disconnection of evaporator 32 from platform 94, or alternatively, allows the installation or removal of evaporator 32 from platform 94. By way of illustration, a controller 166 may continually send an interlock control signal (not shown) to interlock 153 via communication link 90. The provision of the interlock control signal causes interlock 153 to disengage, as represented by the open switch configuration of interlock 153. Under such a condition, evaporator 32 can be installed or removed from platform 94. Alternatively, the absence of the interlock control signal at interlock 153 causes interlock 153 to engage. When interlock 153 is engaged, evaporator 32 is locked onto platform 94, thereby preventing its removal. This interlock feature prevents an operator from removing evaporator 32 when evaporator 32 is under test.

Refrigeration subsystem 126 further includes a pressure sensor 154 in communication with fifth fluid loop section 146 for detecting a fluid pressure of refrigerant 38 in fifth fluid loop section 146. In addition, a fluid bypass line 156 interconnects third fluid loop section 138 with sixth fluid loop section 152 into which a bypass valve system 158 is incorporated. Fluid bypass line 156 splits into parallel first and second line sections 156' and 156", respectively. As shown, a fourth solenoid valve 157, labeled "SV4", and a liquid desuperheat solenoid valve 159, labeled "LDSH-1", are configured in series along first line section 156'. Bypass valve system 158 further includes a fifth solenoid valve 161, labeled "SV5" and a hot gas bypass valve 163, labeled "HGBP-1", configured in series along second line section 156".

Fluid bypass line 156 and bypass valve 158 are utilized to maintain a minimum flow of refrigerant 38 through compressor 128, as known to those skilled in the art. In particular, liquid desuperheat solenoid valve (LDSH-1) 159 and hot gas bypass valve (HGBP-1) 163 are employed to maintain a constant pressure in the fluid loop of test station 86 when station 86 is idle. Once evaporator 32 is evacuated (discussed below), fourth and fifth solenoid valves (SV4, SV5) 157 and 161, respectively, are opened to allow station 86 to idle properly.

Refrigeration subsystem 126 further includes a vacuum pump 160 interconnected with fifth fluid loop section 146 via a vacuum line 162. A second valve 164, labeled "MBV2", and a second solenoid valve 165, labeled "SV2" are interposed in vacuum line 162 between fifth fluid loop section 146 and vacuum pump 160.

Operator station 88 of heat exchanger evaluation system 84 includes controller 166, a thermal imaging camera 168 of which camera lens 102 is part thereof, monitor 100, indicators 104, and actuators 106. Controller 166 generally oversees, manages, and controls the various components of system 84, including interlock 153, a pump down timer 167, labeled T1, and an evacuation timer 169, labeled T2. Controller 166 may encompass a wide variety of electrical devices (programmable or not programmable) having the ability to provide various output signals in response to various input signals.

Communication between controller 166 and test station 86 is schematically represented by communication link 90. In addition, communication between controller 166 and thermal imaging camera 168 is schematically represented by a second communication link 170. Similarly, communication between controller 166 and indicators 104 is schematically represented by a third communication link 172, and communication between controller 166 and actuators 106 is schematically represented by a fourth communication link 174. Images detected by thermal imaging camera 168 are conveyed to monitor 100 via a first video link 176. The images detected by thermal imaging camera 168 may also be optionally digitized and stored in memory (not shown) of controller 166, as generally represented by a second video link 178. Examples of system controller 166 include, but are not limited to, microcomputers, personal computers, dedicated electrical circuits having analog and/or digital components, programmable logic controllers, and various combinations thereof.

Lens 102 of thermal imaging camera 166 is directed toward evaporator 32, i.e., sample location 103 (FIG. 7), when evaporator 32 is secured to platform 94. Thermal imaging camera 168 is an infrared device that detects the different levels of infrared energy given off by areas of different temperatures and displays these as a pattern on monitor 100. As refrigerant 38 flows through evaporator 32, the cool refrigerant 38 causes a surface temperature of evaporator 32 to cool. This change in surface temperature of evaporator 32 is detectable by thermal imaging camera 166. Thermal images generated by thermal imaging camera 166 are presented on monitor 100. An operator can readily review the thermal images to determine whether the surface temperature of evaporator 32 is changing in accordance with pre-determined flow path 79 of refrigerant 38. Thus, the presentation of the thermal images enables a user to ascertain whether the flow of refrigerant 38 deviates from pre-determined flow path 79. A deviation from pre-determined flow path 79 indicates internal leakage, i.e., a bypass condition.

Figure 1:
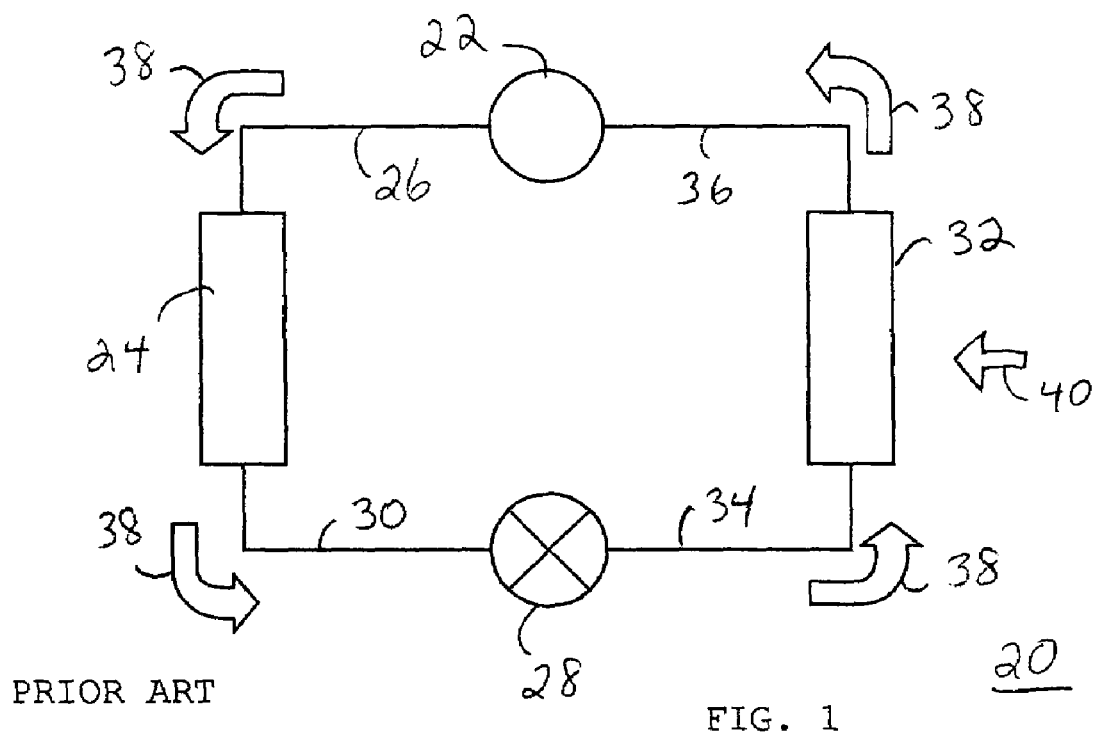
FIG. 1 shows a simplified block diagram of an exemplary refrigeration system.
Figure 8:
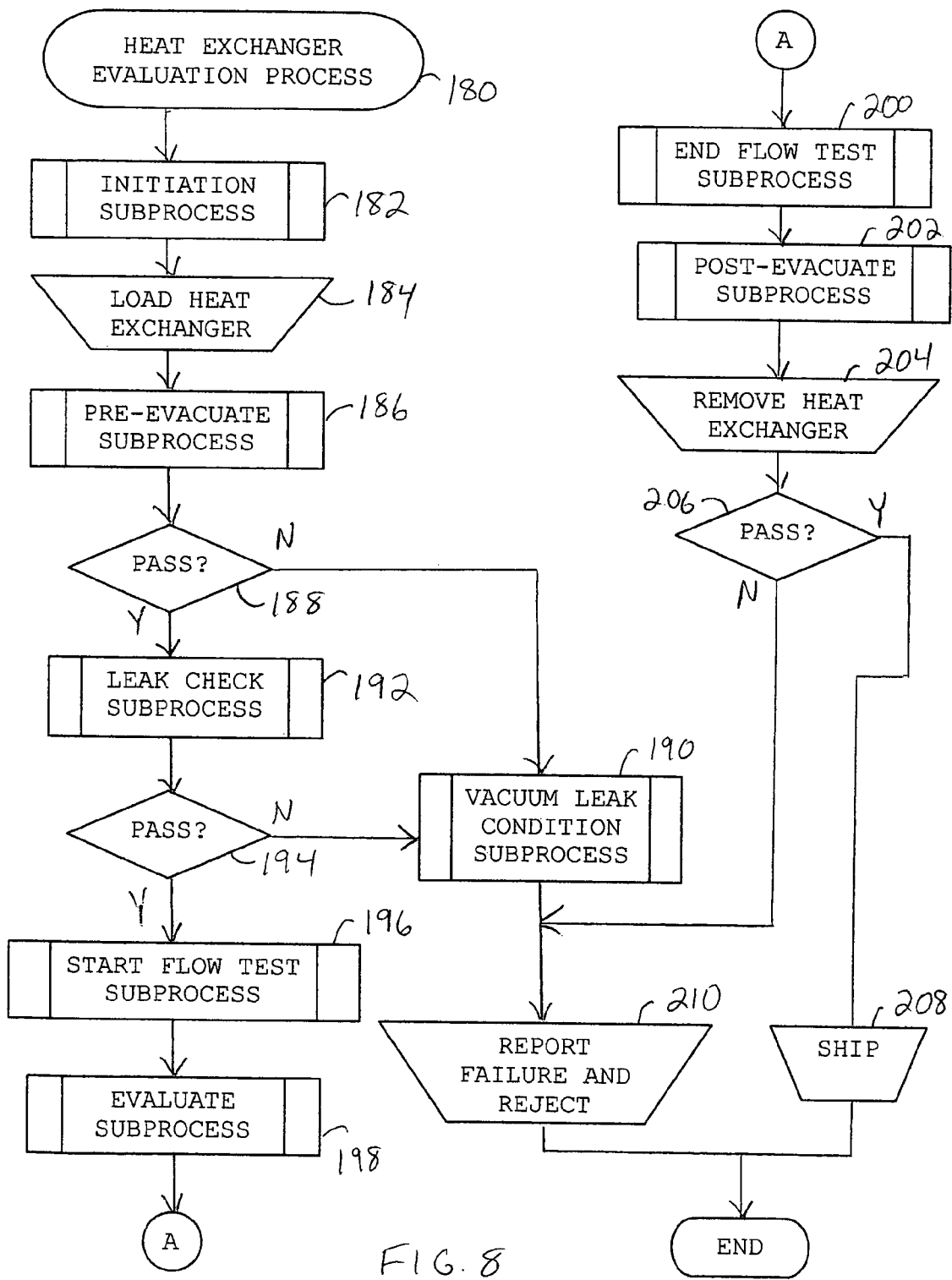
FIG. 8 shows a flow chart of a heat exchanger evaluation process performed in connection with the system of FIG. 6.

FIG. 8 shows a flow chart of a heat exchanger evaluation process 180 performed utilizing heat exchanger evaluation system 84 (FIG. 7). In general, heat exchanger evaluation process 180 represents tasks needed to evaluate the refrigerant flow path of one heat exchanger, for example, evaporator 32 (FIG. 1). However, process 180 can be repeated a multiplicity of times to evaluate a corresponding multiplicity of heat exchangers. Process 180 is envisioned as being executed during post-manufacturing validation testing to verify the efficacy of the manufacturing process. For example, one heat exchanger from a single production lot of heat exchangers may be tested to verify the efficacy of the manufacturing process for that particular production lot of heat exchangers. The present invention enables post-manufacturing validation testing that is rapid and does not result in the destruction of the tested heat exchanger. Accordingly, the present invention achieves great cost savings, in terms of materials, time, and labor, over prior art validation testing techniques.

Heat exchanger evaluation process 180 includes a series of subprocesses, or subroutines, executed and controlled in large part by controller 166 (FIG. 7) of heat exchanger evaluation system 84 (FIG. 7), interspersed with operator-assisted tasks and decisions. An overview of heat exchanger evaluation process 180 is provided below, and detailed discussion of the subprocesses is provided in connection with the ensuing figures.

Heat exchanger evaluation process 180 begins with an initiation subprocess 182. Initiation subprocess 182 is performed by controller 166 (FIG. 7) to initiate the startup of refrigeration subsystem 126, to set system 84 in the correct configuration, and to check for safety hazards. Initiation subprocess 182 is described below in connection with FIG. 9.

In response to a successful execution of initiation subprocess 182, a task 184 is performed by an operator. At task 184, the operator loads heat exchanger 32 (FIG. 2) onto platform 94 (FIG. 7) of system 84.

Next, a pre-evacuate subprocess 186 is performed by controller 166 to draw a vacuum on system 84 utilizing vacuum pump 160 (FIG. 7) and pull any air out of system 84. Air is undesirable in system 84, because the air compromises the effective operation of condenser 92 (FIG. 7). In addition, pre-evacuate subprocess 186 is performed to verify that evaporator 32 has no leaks to the outside environment, i.e., external leaks. Pre-evacuate subprocess 186 is described below in connection with FIG. 10.

Following pre-evacuate subprocess 186, a query task 188 is performed to determine whether evaporator 32 successfully passed pre-evacuate subprocess 186. When evaporator 32 fails pre-evacuate subprocess 186, evaporator 32 is likely to be defective, and process 180 proceeds to a vacuum leak condition subprocess 190. However, when pre-evacuate subprocess 186 is passed, heat exchanger evaluation process 180 proceeds to a leak check subprocess 192.

Vacuum leak condition subprocess 190 is managed by controller 166 (FIG. 7) to indicate an evaporator external leak, to discontinue further testing, and to optionally repeat initiation subprocess 182. Vacuum leak condition subprocess 190 is described below in connection with FIG. 11.

Leak check subprocess 192 tests whether evaporator 32 can sustain the vacuum imparted on it during pre-evacuate subprocess 186. Thus, leak check subprocess 192 determines whether evaporator 32 might have a minute leak to the outside environment that causes it to lose its vacuum after a period of time. Leak check subprocess 192 is described below in connection with FIG. 12.

In response to the execution of leak check subprocess 192, a query task 194 is performed to determine evaporator 32 passed leak check subprocess 192. When evaporator 32 fails leak check subprocess 192, evaporator 32 is likely to be defective, and process 180 proceeds to vacuum leak condition subprocess 190. However, when leak check subprocess 192 is passed, heat exchanger evaluation process 180 proceeds to a start flow test subprocess 196.

Start flow test subprocess 196 is performed by controller 166 to start thermal imaging camera 168 (FIG. 7) and begin the flow of refrigerant 38 (FIG. 7) through refrigeration subsystem 126. Start flow test subprocess 196 is described below in connection with FIG. 13.

Following start flow test subprocess 196, an evaluate subprocess 198 is performed. Evaluate subprocess 198 involves the review of thermal images generated by thermal imaging camera 168 to determine and record whether refrigerant 38 (FIG. 7) follows pre-determined flow path 79 (FIG. 5) through evaporator 32. Evaluate subprocess 198 is described below in connection with FIG. 14.

Heat exchanger evaluate process 180 continues with an end flow test subprocess 200. End flow test subprocess 200 is performed by controller 166 (FIG. 7) to discontinue thermal imaging and to drain evaporator 32 (FIG. 7) of refrigerant 38 (FIG. 7). End flow test subprocess 200 is described below in connection with FIG. 15.

Next, a post-evacuate subprocess 202 is performed by controller 166 to draw a vacuum on evaporator 32 and to set test station 86 in the correct configuration for unloading evaporator 32. Post-evacuate subprocess 202 is described below in connection with FIG. 16.

Once post-evacuate subprocess 202 has been performed, process 180 continues with a task 204, performed by the operator. At task 204, the operator unloads, i.e., removes, heat exchanger 32 (FIG. 2) from platform 94 (FIG. 7) of system 84.

Figure 5:
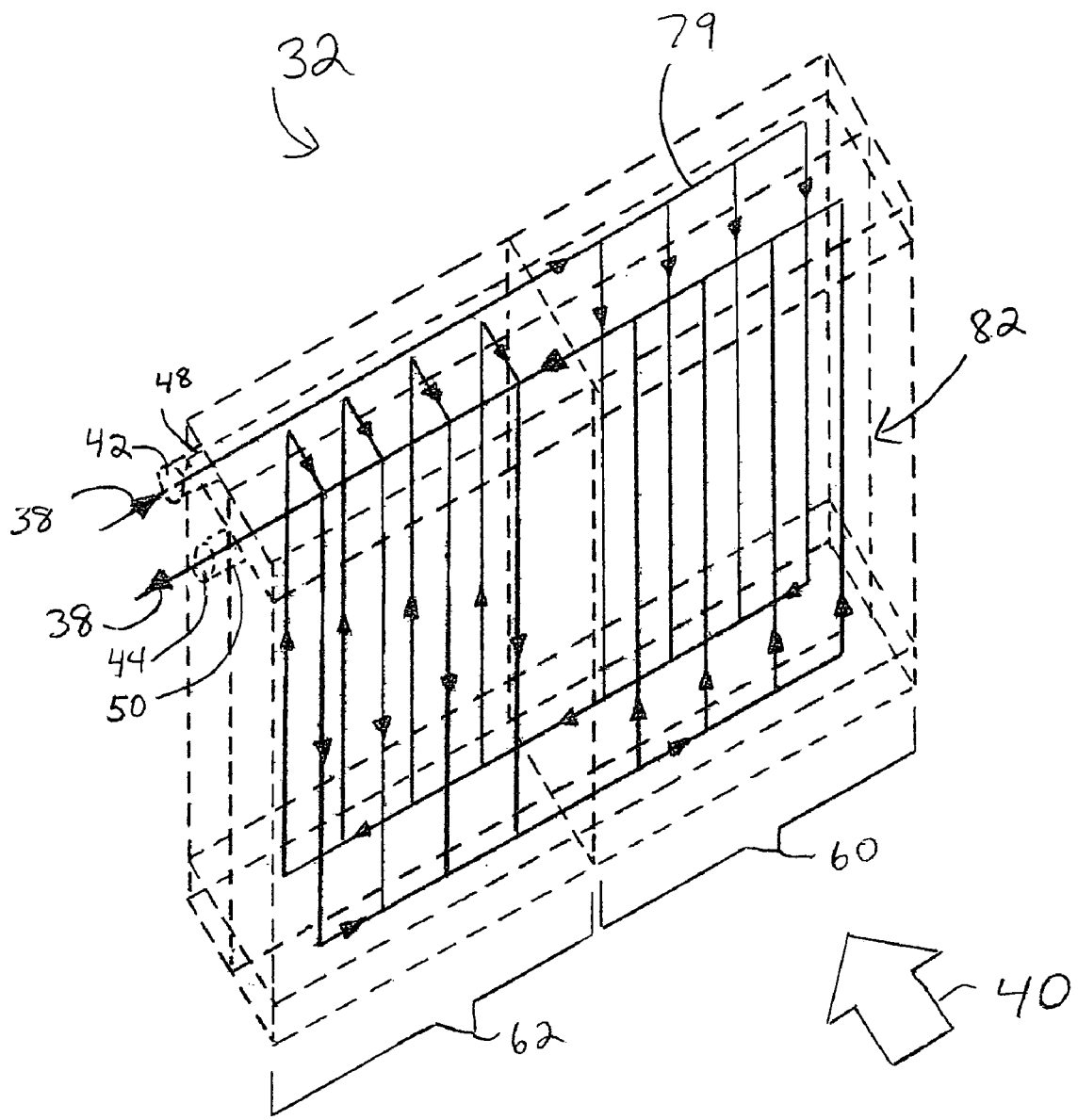
FIG. 5 shows a phantom schematic representation of the evaporator of FIG. 2 illustrating a pre-determined flow path of refrigerant through the evaporator of FIG. 2.

Following task 204, a query task 206 is performed to determine whether evaporator 32 successfully passed the refrigerant flow test, as noted during evaluate subprocess 198. In an exemplary embodiment, evaporator 32 passes the flow test when the thermal images indicate that refrigerant 38 flows through evaporator 32 in correspondence with pre-determined flow path 79 (FIG. 5). Conversely, evaporator 32 fails the flow test when the thermal images indicate that the flow of refrigerant 38 deviates from pre-determined flow path 79.

When it is determined at query task 206 that evaporator 32 has passed the refrigerant flow test, process 180 proceeds to a task 208. At task 208, evaporator 32 is enabled for shipment to market, per conventional labeling and inventory control procedures.

However, when it is determined at query task 206 that evaporator 32 has not passed the refrigerant flow test, or alternatively, following vacuum leak condition subprocess 190, process 180 proceeds to a task 210. At task 210, the test failure is reported along with, for example, the production tracking number of evaporator 32, and the nature of the failure, i.e., an external leak or an internal, bypass, leak. Following either of tasks 208 and 210, heat exchanger evaluation process 180 exits.

Figure 9:
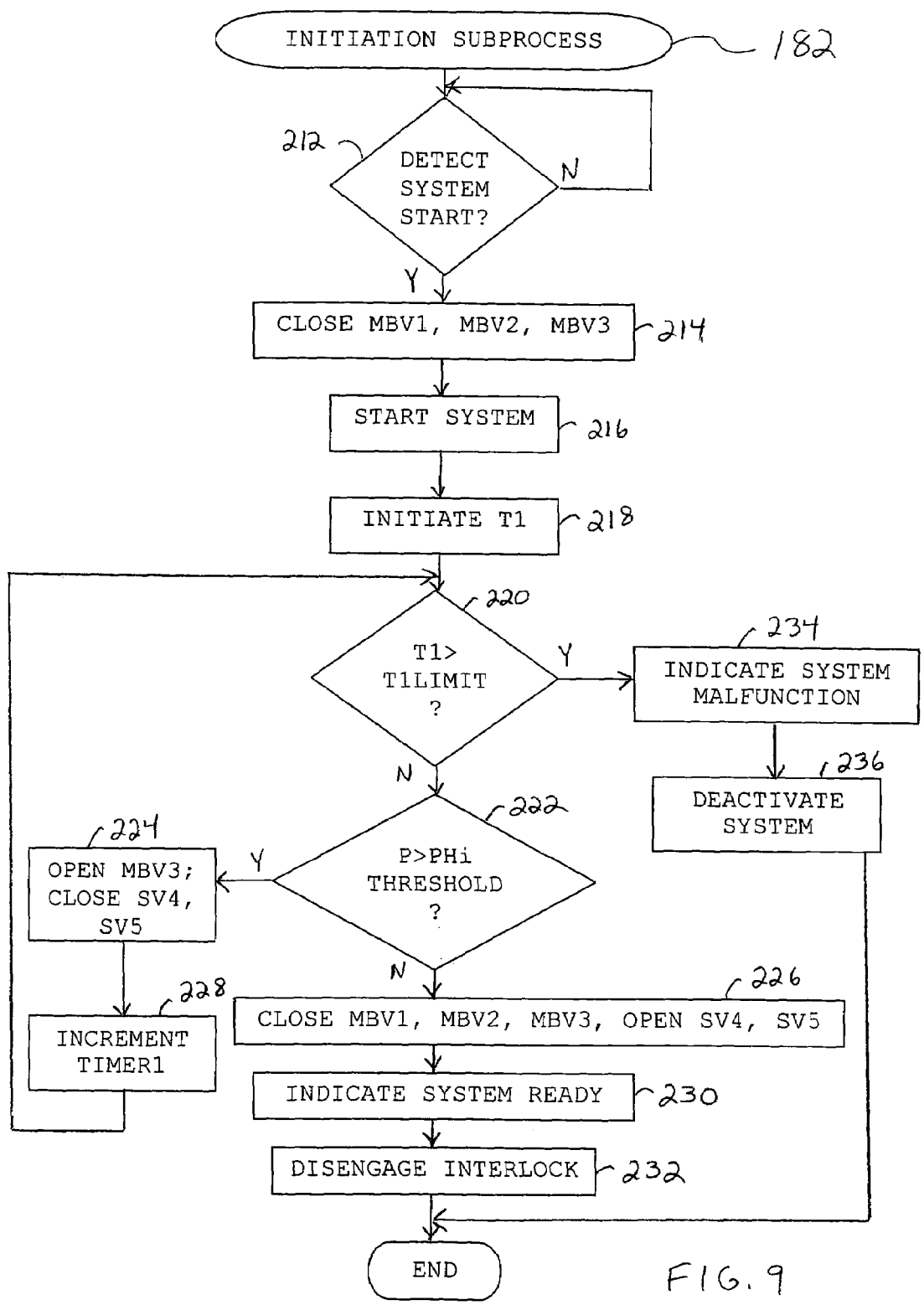
FIG. 9 shows a flow chart of an initiation subprocess of the heat exchanger evaluation process.

FIG. 9 shows a flow chart of initiation subprocess 182 of heat exchanger evaluation process 180. As mentioned above, initiation subprocess 182 is performed by controller 166 (FIG. 7) to initiate the startup of refrigeration subsystem 126, to set system 84 in the correct configuration, and to check for safety hazards.

Initiation subprocess 182 begins with a query task 212. Query task 212 determines whether a system start signal has been detected. Through the execution of subprocess 182, controller 166 continuously monitors for activation of "system on" pushbutton 118 (FIG. 6) by the operator. When activation of "system on" pushbutton 118 is not detected, initiation subprocess 182 loops back to query task 212 to continue monitoring for activation of "system on" pushbutton 118. However, when activation of "system on" pushbutton 118 is detected, initiation subprocess 182 proceeds to a task 214.

At task 214, controller 166 (FIG. 7) signals first, second, and third valves (MBV1, MBV2, MBV3) 140, 164, and 150, respectively (FIG. 7) to close. In this exemplary embodiment, first, second, and third valves 140, 164, and 150 are mechanical ball valves, i.e., valves that require a first control signal open the valves, and a second control signal to close the valves. Thus, controller 166 is readily able to individually control and signal first, second, and third valves 140, 164, and 150 into closed or open positions. It bears noting that first, second, and third solenoid valves (SV1, SV2, SV3) 141, 165, and 157, respectively, require the first control signal to open. Loss of the first control signal will subsequently cause first, second, and third solenoid valves 141, 165, and 157 to close.

Following task 214, a task 216 is performed. At task 216, controller 166 enables power up of refrigeration subsystem 126. In particular, compressor 128 and condenser 92 motors are turned on, fan 98 is turned on, and vacuum pump 160 is activated. Refrigerant 38 is allowed to flow via bypass valve 158 to circulate through refrigeration subsystem 126, bypassing evaporator 32. Other components, known to those skilled in the art, may be included along fluid bypass line 156 (FIG. 7) that changes the state of refrigerant 38 into the liquid-gas mixture expected by compressor 128.

In response to system startup at task 216, a task 218 initiates pump down timer 167 (FIG. 7), by first setting it to zero and then allowing pump down timer 167 to increment. The term "pump down" referred to herein is the activity of draining refrigerant 38 from evaporator 32 via refrigeration subsystem 126, and storing excess refrigerant 38 in receiver 134 (FIG. 7).

Initiation subprocess 182 continues with a query task 220. At query task 220, controller 166 determines whether a current time on pump down timer 167, i.e., T1, is greater than a pre-determined pump down time limit, i.e., T1LIMIT. The pump down time limit is a pre-determined value, retained in program code executed by controller 166, that establishes a maximum amount of time needed for drainage of refrigerant 38. Of course, during a first iteration of query task 220, the current time on pump down timer 167 will not be greater than the pump down time limit. As such, program control proceeds to a query task 222.

At query task 222, controller compares a pressure value detected at pressure sensor 154 with a high pressure threshold for system 84. When the measured pressure is greater than the high pressure threshold, initiation subprocess 182 proceeds to a task 224 to attempt to lower the pressure detected at pressure sensor 154. The detected pressure at pressure sensor 154 may be undesirably high if refrigerant 38 remains in fifth fluid loop section 146 (FIG. 7) from a previous test and/or if an evaporator is still connected to platform 94. However, when the measured pressure is lower than the high pressure threshold, initiation subprocess 182 proceeds to a task 226 (discussed below).

At task 224, controller 166 signals third valve (MBV3) 150, to open and signals fourth and fifth solenoid valves (SV4, SV5) 157 and 161, respectively to close to allow any remaining refrigerant 38 to drain, i.e., pump down, for collection in receiver 134 (FIG. 6). A background activity, task 228, is performed to increment pump down timer 167. Although shown as a discrete task, it should be understood that incrementing task 228 is performed in accordance with conventional timing procedures. In response to tasks 224 and 228 and following a waiting period, subprocess 182 loops back to query task 220 to determine whether a current time on pump down timer 167 exceeds the pump down time limit. Accordingly, tasks 220, 222, 224, and 228 are performed to drain, or pump down, refrigeration subsystem 126 as needed, so as to put test station in a safe mode.

Conversely, when query task 222 determines that the pressure detected at pressure sensor 154 is less than the high pressure threshold, task 226 causes controller 166 (FIG. 7) to convey signaling to close first, second, and third valves (MBV1, MBV2, MBV3) 140, 164, and 150, as needed. Task 226 also causes controller 166 to convey signaling to open fourth and fifth solenoid valves (SV4, SV5) 157 and 161, respectively (FIG. 7), so that test station 86 will idle properly.

A task 230 is performed following task 226. At task 230, controller 166 indicates that heat exchanger evaluation system 84 is ready. Indication is made by illuminating system ready indicator 112 (FIG. 6).

Following task 230, a task 232 is performed by controller 166 to disengage interlock 153 (FIG. 7). As mentioned above, controller 166 normally provides an interlock control signal to interlock 153 which causes interlock 153 to be disengaged, thereby allowing evaporator 32 to be installed or removed from platform 94. Accordingly, if another evaporator from a previous test was already locked onto platform 94, it can now be safely removed. Moreover, task 232 ascertains that interlock 153 is "disengaged", so that evaporator 32 (FIG. 2) can be successfully loaded onto, and engaged with first and second fluid ports 142 and 148 (FIG. 7) of platform 94. Thus, interlock 153 is disengaged only after it has been determined that the pressure detected at pressure sensor 154 has dropped to a safe level below the high pressure threshold. Following task 232, initiation subprocess 182 exits and heat exchanger evaluation process 180 (FIG. 8) can continue. For example, the operator can now safely load evaporator 32 (FIG. 2) onto platform 94, as shown in task 184 (FIG. 8) of process 180 (FIG. 8).

Returning back to query task 220, when pump down timer 167 times out, i.e., the value of pump down timer 167 exceeds the pump down time limit, T1LIMIT, program control proceeds to a task 234. It should be appreciated that task 234 is arrived at only when pump down timer 167 exceeds the pump down time limit, T1LIMIT, and the system pressure detected at pressure sensor 154 (FIG. 7) fails to drop below the high pressure threshold. In such an instance, system 84 (FIG. 7) cannot be placed in a safe operating mode. Thus, task 234 is performed to indicate a system malfunction. Indication is made by illuminating system fail indicator 110 (FIG. 6).

A task 236 is performed in connection with task 234. At task 236, refrigeration subsystem 126 (FIG. 7) is deactivated. For example, controller 166 sends the appropriate signaling via communication link 90 to deactivate the components of test station 86 (FIG. 7). Following task 236, initiation subprocess 182 exits, but heat exchanger evaluation process 180 (FIG. 8) cannot continue due to a malfunction of test station 86 (FIG. 7).

Figure 10:
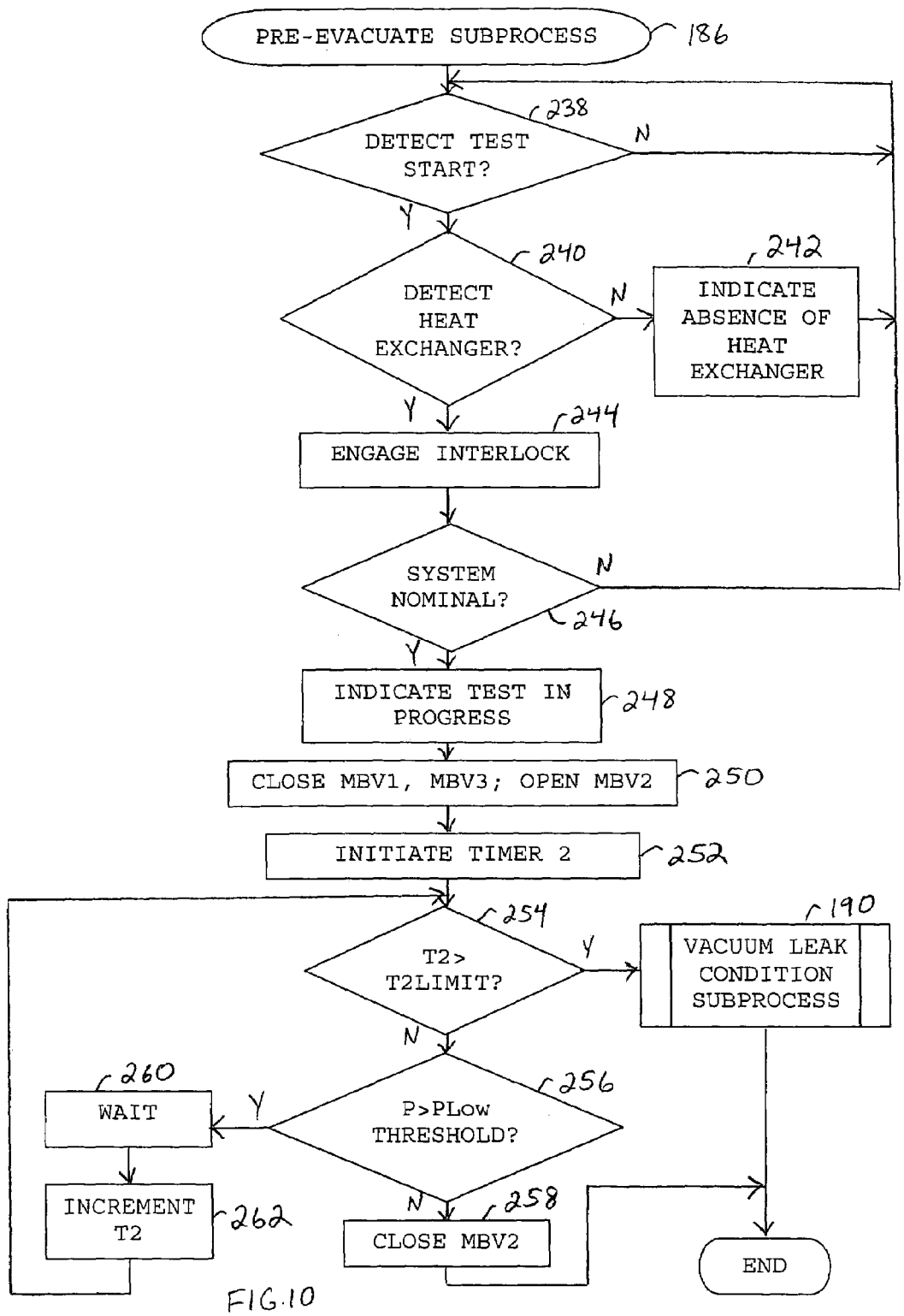
FIG. 10 shows a flow chart of a pre-evacuation subprocess of the heat exchanger evaluation process.

FIG. 10 shows a flow chart of pre-evacuate subprocess 186 of heat exchanger evaluation process 180 (FIG. 8). As mentioned above, pre-evacuate subprocess 186 is performed to draw a vacuum on system 84 utilizing vacuum pump 160 (FIG. 7), pull any air out of system 84, and to verify that evaporator 32 has no leaks to the outside environment. Thus, subprocess 186 external leakage validation testing of evaporator 32.

Pre-evacuate subprocess 186 begins with a query task 238. Query task 238 determines whether a test start signal has been detected. Through the execution of subprocess 186, controller 166 continuously monitors for activation of "test start" pushbutton 122 (FIG. 6) by the operator. When activation of "test start" pushbutton 122 is not detected, pre-evacuate subprocess 186 loops back to query task 238 to continue monitoring for activation of "test start" pushbutton 122. However, when activation of "test start" pushbutton 122 is detected, pre-evacuate subprocess 186 proceeds to a query task 240.

At query task 240, controller 166 (FIG. 7) determines whether a heat exchanger, i.e., evaporator 32 (FIG. 7) is detected in engagement with platform 94. Detection is ascertained when an interlock feedback signal (not shown) is communicated to controller 166 via communication link 90 (FIG. 7) and conventional signaling procedures. When an interlock feedback signal is not detected pre-evacuate subprocess 186 proceeds to a task 242. However, when query task 240 determines that evaporator 32 is in engagement with platform 94, pre-evacuate subprocess 186 continues with a task 244.

At task 242, system 84 indicates the absence of evaporator 32. Indication may be made by illuminating system fail indicator 110 (FIG. 6). System fail indicator 110 may be set to blink on and off, or may be set to stay on. Alternatively, or in addition, an audible alarm (not shown) may sound to indicate the absence of evaporator 32. In response to task 242, subprocess 186 loops back to query task 238 to continue monitoring for activation of "test start" pushbutton 122, and the presence of evaporator 32.

Following the detection of evaporator 32 at query task 240, task 244 causes the engagement of interlock 153. That is, the interlock control signal normally provided to interlock 153 by controller 166 is discontinued. The interruption of the interlock control signal causes engagement of interlock 153 thereby preventing the removal of evaporator 32 from platform 94.

Next, a query task 246 verifies whether test station 86 (FIG. 7) is operating under nominal conditions. This verification may entail internal signaling between controller 166 and test station 86. When test station 86 is not operating under nominal conditions, subprocess 186 may loop back to query task 238 to continue monitoring for activation of "test start" pushbutton 122, the presence of evaporator 32, and nominal operations signaling. In such a loop back scenario, pre-evacuate subprocess 186 cannot proceed until test station 86 is safely configured. However, when test station 86 is operating under nominal conditions, subprocess 186 proceeds to a task 248.

At task 248, system 84 indicates that a test is in progress. Indication may be made by illuminating "system running" indicator 114 (FIG. 6).

Subprocess 186 continues with a task 250. At task 250, controller 166 signals first and third valves (MBV1, MBV3) 140 and 150, respectively (FIG. 7), to close, and signals second valve (MBV2) 164 (FIG. 7) to open. Since vacuum pump 160 (FIG. 7) was previously activated, vacuum pump 160 immediately begins to evacuate evaporator 32.

A task 252 performed in connection with task 250 initiates evacuation timer 169 (FIG. 7), "T2" by first setting it to zero, and then allowing evacuation timer 169 to increment.

Pre-evacuate subprocess 186 continues with a query task 254. At query task 254, controller 166 determines whether a current time on evacuation timer 169, i.e., T2, is greater than a pre-determined evacuation time limit, i.e., T2LIMIT. The evacuation time limit is a pre-determined value, retained in program code executed by controller 166, that establishes a maximum amount of time for evaporator 32 to be fully evacuated. Of course, during a first iteration of query task 254, the current time on evacuation timer 169 will not be greater than the evacuation time limit. As such, program control proceeds to a query task 256.

At query task 256, controller 166 compares a pressure value detected at pressure sensor 154 with a low pressure threshold (PLow THRESHOLD) for system 84. When the detected pressure is lower than the low pressure threshold, indicating evacuation is complete, pre-evacuate subprocess 186 proceeds to a task 258.

At task 258, controller 166 (FIG. 7) signals second valve (MBV2) 164 to close, thus concluding evacuate subprocess 186. Following task 258, subprocess 186 exits.

When query task 256 determines that the detected pressure is greater than the low pressure threshold, subprocess 186 proceeds to a task 260. At task 260, controller 166 imposes a predetermined waiting period, and a background activity, a task 262, is performed to increment evacuation timer 169. Although shown as a discrete task, it should be understood that incrementing task 262 is performed in accordance with conventional timing procedures. In response to tasks 260 and 262, subprocess 186 loops back to query task 254 to determine whether a current time on evacuation timer 169 exceeds the evacuation time limit. Accordingly, tasks 254, 256, 260, and 262 are performed to evacuate evaporator 32.

Returning back to query task 254, when evacuation timer 169 times out, i.e., the value of evacuation timer 169 exceeds the evacuation time limit, T2LIMIT, program control proceeds to vacuum leak condition subprocess 190, which is described in detail in connection with FIG. 11. It should be appreciated that subprocess 190 is arrived at within pre-evacuate subprocess 186 only when evacuation timer 169 exceeds the evacuation time limit, T2LIMIT, and the system pressure detected at pressure sensor 154 (FIG. 7) fails to drop below the low pressure threshold. In such an instance, evaporator 32 (FIG. 7) cannot be evacuated. Evaporator 32 may not be effectively evacuated if it is defective, having a leak to the outside environment. In response to the execution of vacuum leak condition subprocess 190 within pre-evacuate subprocess 186, subprocess 186 exits having failed to fully evacuate evaporator 32.

Figure 11:
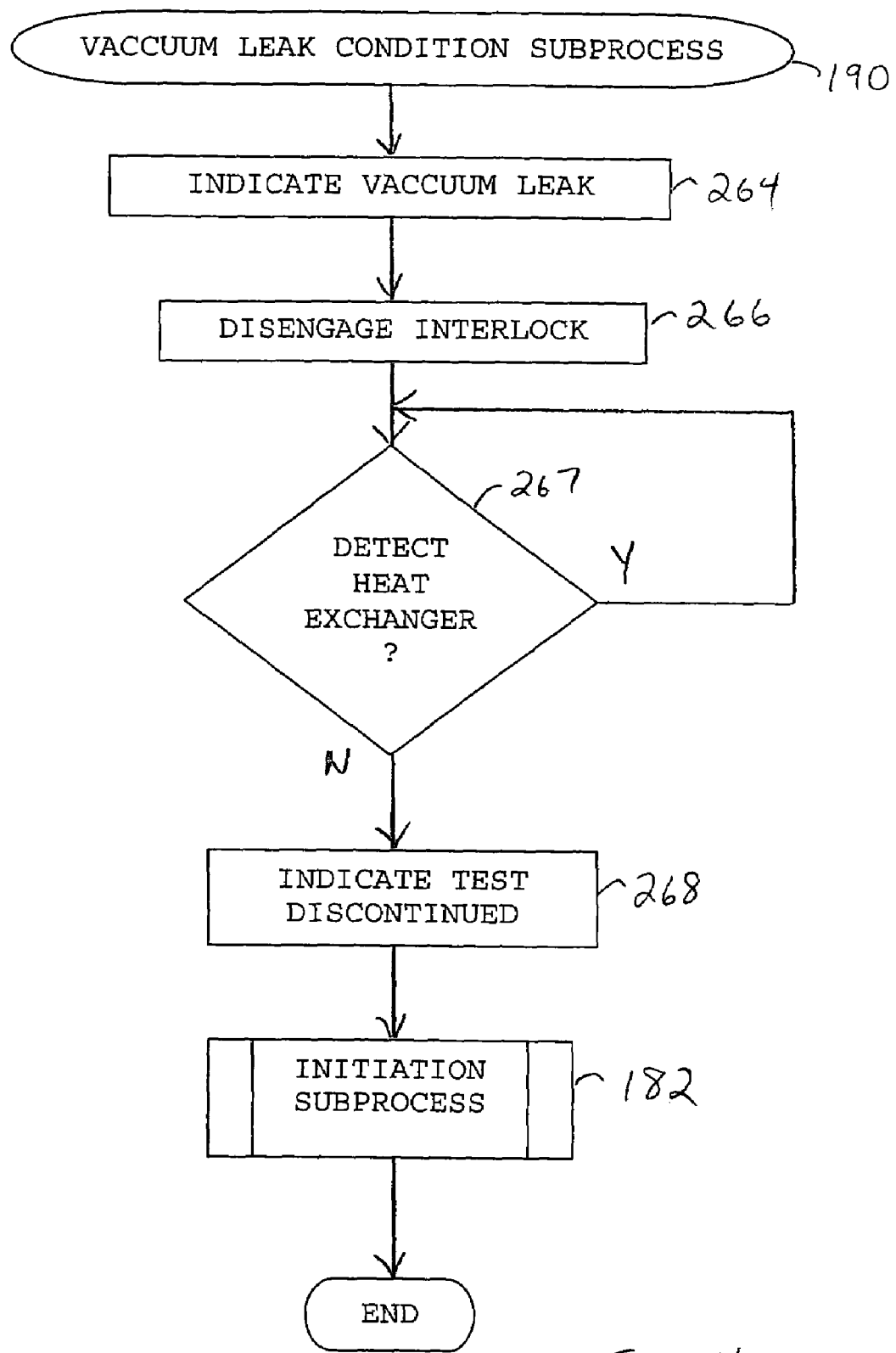
FIG. 11 shows a flow chart of a vacuum leak condition subprocess of the heat exchanger evaluation process.

FIG. 11 shows a flow chart of vacuum leak condition subprocess 190 of heat exchanger evaluation process 180 (FIG. 8). Subprocess 190 is managed by controller 166 (FIG. 7) to indicate an evaporator external link, to discontinue further testing, and to optionally repeat initiation subprocess 182.

Subprocess 190 begins with a task 264. At task 264, controller 166 (FIG. 7) indicates a vacuum leak. Indication may be made by illuminating "vacuum leak" indicator 116 (FIG. 6).

Next, a task 266 is performed to disengage interlock 153 (FIG. 6) so that evaporator 32 can be removed from platform 94. Disengagement of interlock 153 is accomplished by providing the interlock control signal from controller 166 (FIG. 7) to interlock 153.

In response to task 266, a query task 267 is performed. At query task 267, controller 166 determines whether evaporator 32 is detected in engagement with platform 94. Detection is ascertained when an interlock feedback signal is communicated to controller 166 via communication link 90 (FIG. 7). When the interlock feedback signal is detected, indicating that evaporator 32 has not yet been removed from platform 94, program control loops back to query task 267 to await the loss of the interlock feedback signal. Consequently, controller 166 may pause from further activities until it detects the loss of the interlock feedback signal. However, when controller 166 detects the loss of the interlock feedback signal, indicating that evaporator 32 has now been removed from platform 94, program control proceeds to a task 268.

At task 268, controller 166 indicates that the current test has been discontinued. Indication may be made by extinguishing "system running" indicator 114 (FIG. 6).

Following task 268, program control may optionally proceed to initiation subprocess 182, which is described in detail in connection with FIG. 9, to await another attempt to perform a leak check and fluid low test on another evaporator. In response to the execution of initiation subprocess 182 within vacuum leak condition subprocess 190, subprocess 190 exits.

Figure 12:
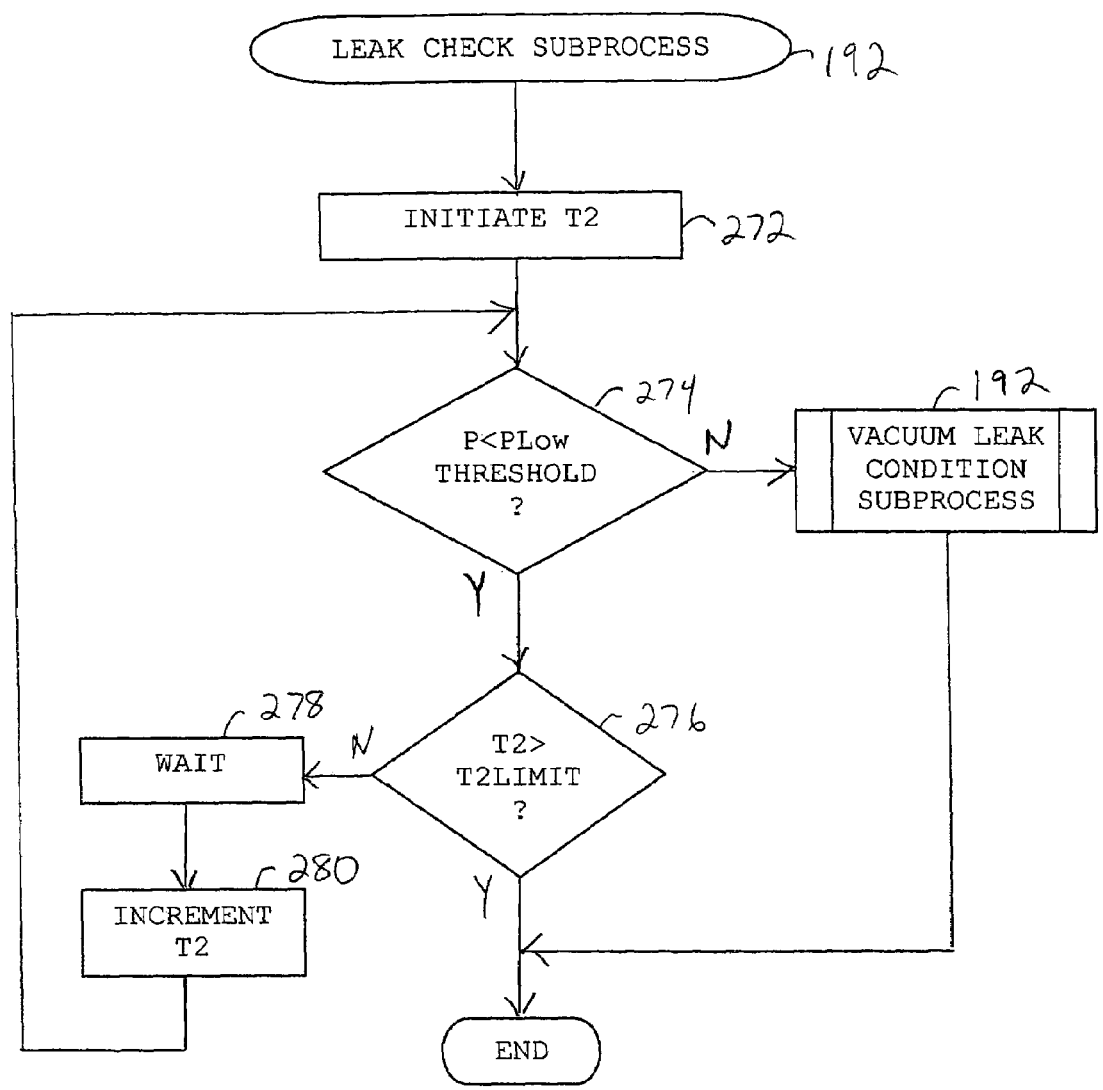
FIG. 12 shows a flow chart of a leak check subprocess of the heat exchanger evaluation process.

FIG. 12 shows a flow chart of leak check subprocess 192 of heat exchanger evaluation process 180. As mentioned above, leak check subprocess 192 is performed to determine whether evaporator 32 can sustain the vacuum imparted on it during pre-evacuate subprocess 186 for a period of time, thereby ruling out a minute leak to the outside environment.

Leak check subprocess 192 begins with a task 272. At task 272, controller 166 (FIG. 7) initiates evacuation timer 169

(FIG. 7), "T2", by first setting it to zero, and then allowing evacuation timer 169 to increment.

Leak check subprocess 192 continues with a query task 274. At query task 274, controller 166 compares a pressure value detected at pressure sensor 154 with a low pressure threshold (PLow THRESHOLD). When the detected pressure is higher than the low pressure threshold, indicating a vacuum leak, leak check subprocess 192 proceeds to vacuum leak condition subprocess, discussed in connection with FIG. 11, with evaporator 32 having failed the leak test. Subprocess 192 subsequently exits. However, when the detected pressure is lower than the low pressure threshold at query task 274, leak check subprocess 192 proceeds to a query task 276.

At query task 276, controller 166 determines whether a current time on evacuation timer 169, i.e., T2, remains less than the pre-determined evacuation time limit, i.e., T2LIMIT. When the current time on evacuation timer 169 is less than T2LIMIT, program control proceeds to a task 278.

At task 278, controller 166 imposes a predetermined waiting period, and a background activity, a task 280, is performed to increment evacuation timer 169. Although shown as a discrete task, it should be understood that incrementing task 280 is performed in accordance with conventional timing procedures.

In response to tasks 278 and 280, leak check subprocess 192 loops back to query task 274 to again check evaporator pressure at pressure sensor 154 (FIG. 6), and to again check evacuation timer 169. When evacuation timer 169 times out, and the detected pressure at pressure sensor 154 remains below the low pressure threshold, leak check subprocess 192 exits, with evaporator having successfully passed the leak check.

Figures 13, 14:
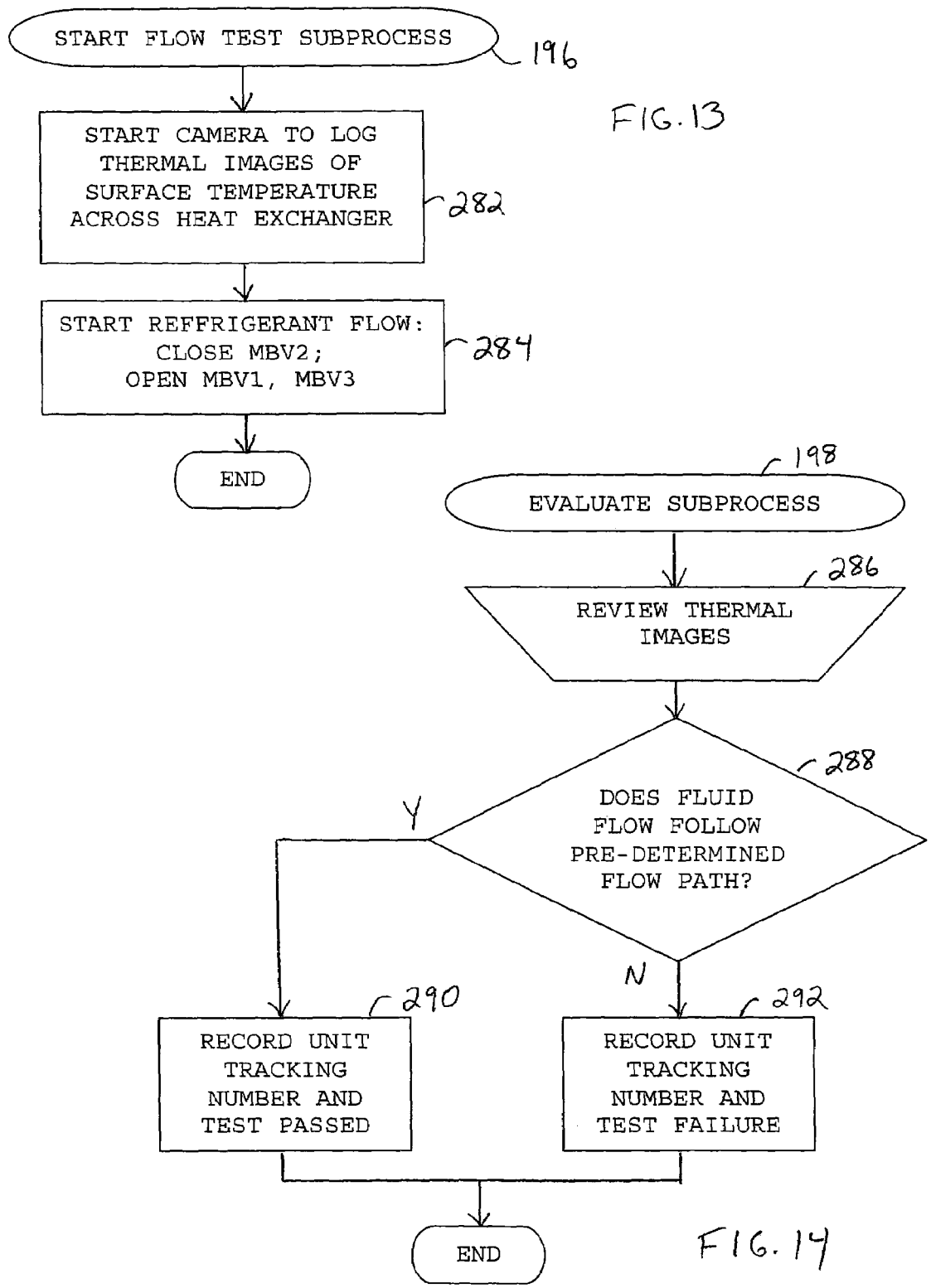
FIG. 13 shows a flow chart of a start test subprocess of the heat exchanger evaluation process.
FIG. 14 shows a flow chart of an evaluate subprocess of the heat exchanger evaluation process.

FIG. 13 shows a flow chart of start flow test subprocess 196 of heat exchanger evaluation process 180 (FIG. 8). As mentioned previously, start test subprocess 196 is performed by controller 166 to start thermal imaging camera 168 (FIG. 7) and route refrigerant 38 (FIG. 7) through refrigeration subsystem 126.

To that end, subprocess 196 begins with a task 282. At task 282, controller 166 (FIG. 7) sends the appropriate signaling via second communication link 170 (FIG. 7) to start thermal imaging camera 168 (FIG. 7), and begin the logging of thermal images representing the surface temperature across the heat exchanger, i.e., evaporator 32.

Task 282 is followed by a task 284. At task 284, controller 166 initiates the flow of refrigerant 38 in refrigeration subsystem 126 (FIG. 6) of test station 86 (FIG. 6). In order to do so, controller 166 signals second valve (MBV2) 164 (FIG. 7) to close, and signals first and third valves (MBV1, MBV3) 140 and 150 (FIG. 7) to open. Accordingly, refrigerant 38 is enabled to enter evaporator 32. As refrigerant 38 flows through evaporator 32, the thermal images of evaporator 32 will reveal a temperature change across evaporator 32 resulting from the cool refrigerant 38 flowing into the warmer evaporator 32. When refrigerant 38 follows pre-determined flow path 79, the thermal images will reveal a change in the surface temperature of evaporator 32 in an expected manner. However, when there is internal leakage, i.e., a bypass condition, the thermal images will reveal changes in the surface temperature of evaporator 32 that deviate from the expected manner. Exemplary illustrations of thermal images will be discussed below in connection with FIGS. 18a-b. Following the initiation of the flow of refrigerant 38 at task 284, start flow test subprocess 196 exits.

FIG. 14 shows a flow chart of evaluate subprocess 198 of heat exchanger evaluation process 180 (FIG. 8). Evaluate subprocess 198 involves the review of thermal images generated by thermal imaging camera 168 to determine and record whether refrigerant 38 (FIG. 7) follows pre-determined flow path 79 (FIG. 5) through evaporator 32. Evaluate subprocess 196 may be executed as a "real-time" activity in conjunction with the initiation of start flow test subprocess 196 (FIG. 13). Alternatively, the thermal images may be recorded and evaluated "off-line."

Subprocess 198 begins with a task 286 at which the thermal images for a given flow test are evaluated. In an exemplary embodiment, an operator may review successively presented thermal images to determine whether the flow of refrigerant 38 through evaporator 32 deviates from pre-determined flow path 79 (FIG. 5). Alternatively, task 286 may be an automated evaluation in which a computing system is utilized to compare the thermal images with data corresponding to normal flow along pre-determined flow path 79.

In response to task 286, a query task 288 is performed. At query task 288, a determination is made as to whether refrigerant 38 follows pre-determined flow path 79. This can be an operator determined decision and/or a processor determined decision.

When refrigerant 38 follows pre-determined flow path 79, evaluate subprocess 198 proceeds to a task 290. At task 290, an identifier for evaporator 32, such as a production tracking number, is recorded along with an indicator that evaporator 32 passed the fluid flow test.

However, when it is determined at query task 288 that refrigerant 38 does not follow pre-determined flow path 79, evaluate subprocess 198 proceeds to a task 292. At task 292, an identifier for evaporator 32, such as a production tracking number, is recorded along with an indicator that evaporator 32 failed the fluid flow test. Following either of tasks 290 and 292, evaluate subprocess 198 exits.

Figure 15:
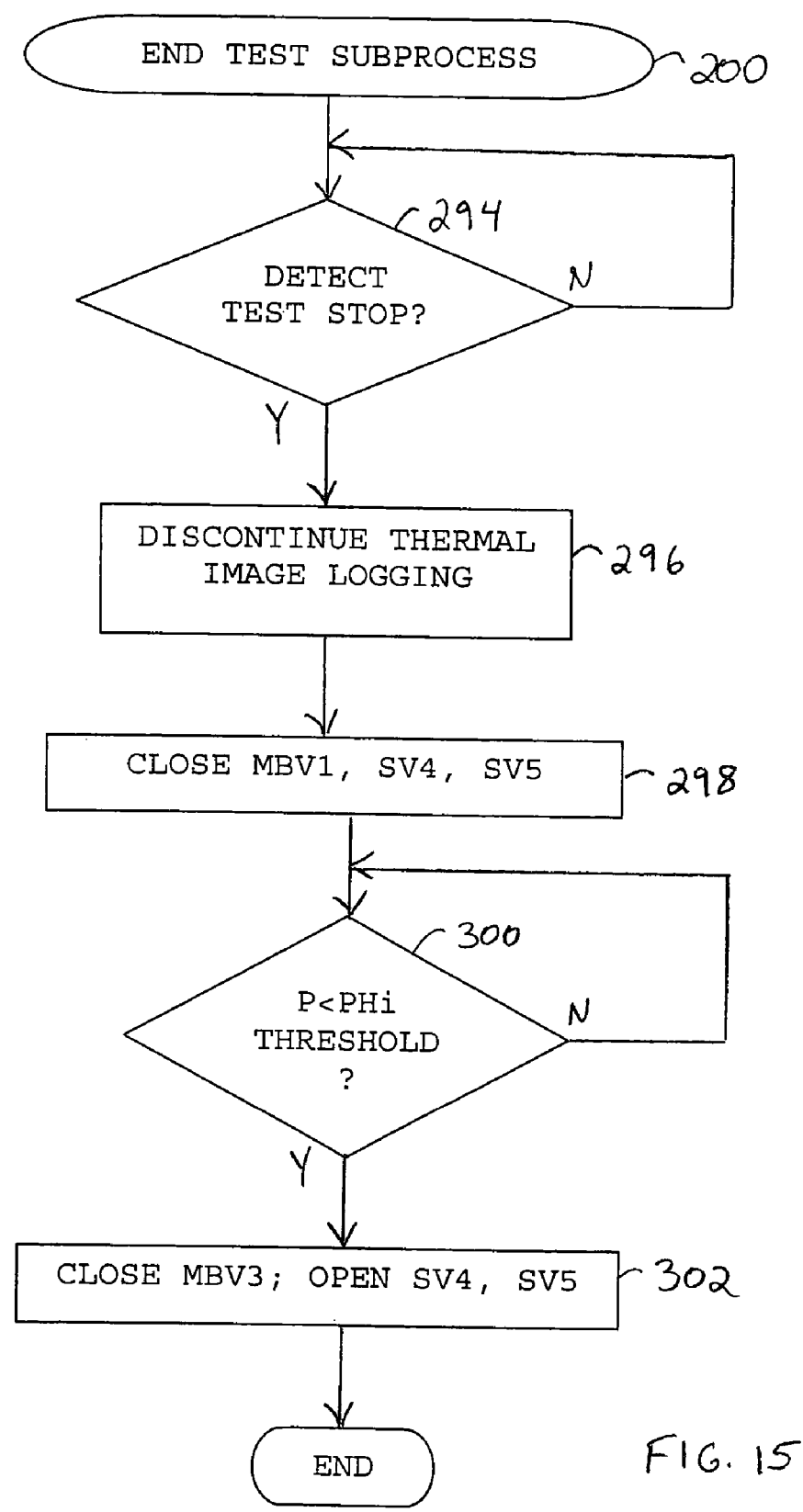
FIG. 15 shows a flow chart of an end test subprocess of the heat exchanger evaluation process.

FIG. 15 shows a flow chart of end test subprocess 200 of heat exchanger evaluation process 180 (FIG. 8). As mentioned above, end test subprocess 200 is performed by controller 166 (FIG. 7) to discontinue thermal imaging and to drain evaporator 32 (FIG. 7) of refrigerant 38 (FIG. 7).

End test subprocess 200 begins with a query task 294. Query task 294 determines whether a test stop signal has been detected. Through the execution of subprocess 186, controller 166 continuously monitors for activation of "test stop" pushbutton 124 (FIG. 6) by the operator. When activation of "test stop" pushbutton 124 is not detected, end test subprocess 200 loops back to query task 294 to continue monitoring for activation of "test stop" pushbutton 124. However, when activation of "test stop" pushbutton 124 is detected, pre-evacuate subprocess 186 proceeds to a task 296. Those skilled in the art will readily recognize that the test stop signal need not be provided by an operator. In an alternative embodiment, controller 166 may stop the fluid flow test after a pre-determined period of time.

At task 296, controller 166 sends the appropriate signaling via second communication link 170 (FIG. 7) to discontinue the logging of thermal images by stopping the operation of thermal imaging camera 168 (FIG. 7).

Following task 296, a task 298 is performed by controller 166. At task 298, controller 166 signals first valve (MBV1) 140 (FIG. 7) to close and signals fourth and fifth solenoid valves (SV4, SV5) 157 and 161, respectively, to close. With first valve 140 closed, refrigerant 38 now flows through compressor 128 (FIG. 7) and condenser 92 (FIG. 7), drains from evaporator 32, and collects in receiver 134 (FIG. 7).

A query task 300 is performed following task 298. At query task 300, controller 166 monitors the pressure detected at pressure sensor 154 (FIG. 7) to determine whether it drops below the high pressure threshold (PHi THRESHOLD). The pressure at sensor 154 will drop as refrigerant 38 drains from evaporator 32. When the pressure has not dropped below the high pressure threshold, program control loops back to query task 300 to continue monitoring for a pressure drop at pressure sensor 154. However, when controller 166 determines at query task 300 that the detected pressure has dropped below the high pressure threshold, subprocess 200 continues with a task 302.

At task 302, controller 166 signals third valve (MBV3) 150 (FIG. 7) to close. That is, refrigerant 38 is sufficiently drained from evaporator 32, i.e., evaporator pump down has occurred. In addition, controller 166 signals fourth and fifth solenoid valves (SV4, SV5) 157 and 161, respectively (FIG. 7), to open so that test station 86 will idle properly. Following task 302, end test subprocess 200 exits.

Figure 16:
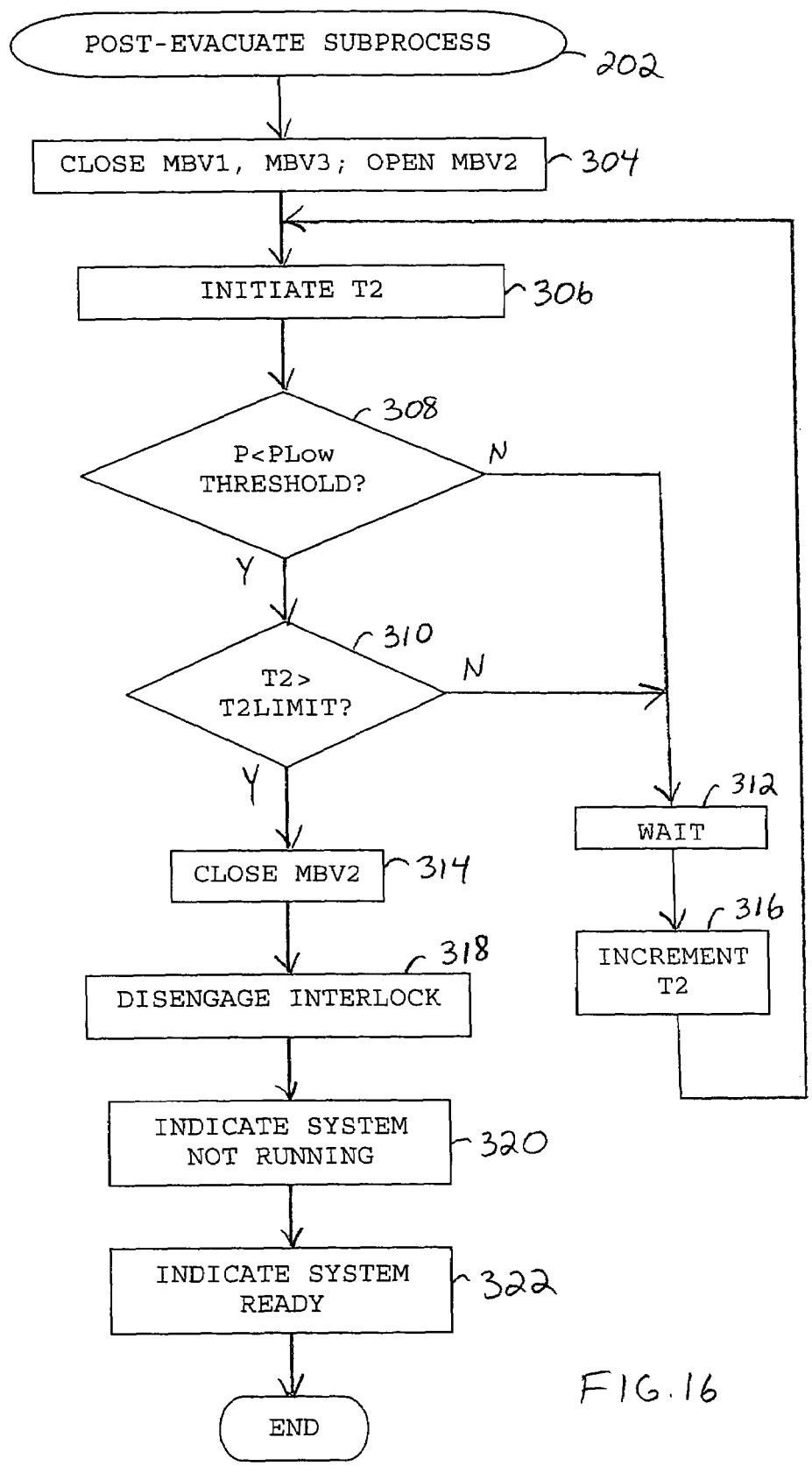
FIG. 16 shows a flow chart of a post-evacuate subprocess of the heat exchanger evaluation process.

FIG. 16 shows a flow chart of post-evacuate subprocess 202 of heat exchanger evaluation process 180 (FIG. 8). Post-evacuate subprocess 202 is performed by controller 166 to evacuate evaporator 32 and to set test station 86 in the correct configuration for unloading evaporator 32.

Post-evacuate subprocess 202 begins with a task 304. At task 304, controller 166 signals first and third valves (MBV1, MBV3) 140 and 150, respectively (FIG. 7), to close, and signals second valve (MBV2) 164 (FIG. 7) to open.

A task 306, performed in connection with task 304, initiates evacuation timer 169 (FIG. 7), "T2" by first setting it to zero, and then allowing evacuation timer 169 to increment.

Subprocess 202 continues with a query task 308. At query task 308, controller 166 compares a pressure value detected at pressure sensor 154 (FIG. 7) with a low pressure threshold (PLow THRESHOLD). When the detected pressure is lower than the low pressure threshold, post-evacuate subprocess 202 proceeds to a query task 310. However, when the detected pressure is not lower than the low pressure threshold, subprocess 202 proceeds to a task 312.

At query task 310, controller 166 determines whether a current time on evacuation timer 169, i.e., T2, is greater than a pre-determined evacuation time limit, i.e., T2LIMIT. When the current time on evacuation timer 169 is greater than the pre-determined evacuation time limit, post-evacuate subprocess 202 proceeds to a task 314 (discussed below). However, when the current time on evacuation timer 169 is less than the evacuation time limit, subprocess 202 also proceeds to a task 312. It bears noting that if either the pressure detected at pressure sensor 154 is not below the low pressure threshold or if the current time on evacuation timer 169 is not greater than the evacuation time limit, process control proceeds to task 312.

At task 312, controller 166 imposes a predetermined waiting period, and a background activity, a task 316, is performed to increment evacuation timer 169. Although shown as a discrete task, it should be understood that incrementing task 316 is performed in accordance with conventional timing procedures.

In response to tasks 312 and 316, post-evacuation subprocess 202 loops back to query task 308 to again check evaporator pressure at pressure sensor 154 (FIG. 6), and to again check evacuation timer 169. When evacuation timer 169 times out, and the detected pressure at pressure sensor 154 remains below the low pressure threshold, post-evacuation subprocess 202 proceeds to task 314. The post-evacuation activities thoroughly drains evaporator 32 so that evaporator 32 can be prepared for eventual distribution.

At task 314, controller 166 (FIG. 7) signals second valve (MBV2) 164 (FIG. 7) to close.

A task 318 is performed following task 314. Task 318 is performed by controller 166 to disengage interlock 153 (FIG. 7). That is, controller 166 resumes the provision of the interlock control signal which causes interlock 153 to be disengaged, and thereby allows evaporator 32 to be removed from platform 94.

In response to task 318, a task 320 is performed. At task 320, system 84 indicates that a test is no longer in progress. Indication may be made by extinguishing the previously illuminated "system running" indicator 114 (FIG. 6).

Next, a task 322 indicates that system 84 is performed by controller 166 to indicate that heat exchanger evaluation system 84 is ready. Indication is made by illuminating, or maintaining the illumination of, system ready indicator 112 (FIG. 6). Following task 322, post-evacuation subprocess 202 exits.

Figure 17A:
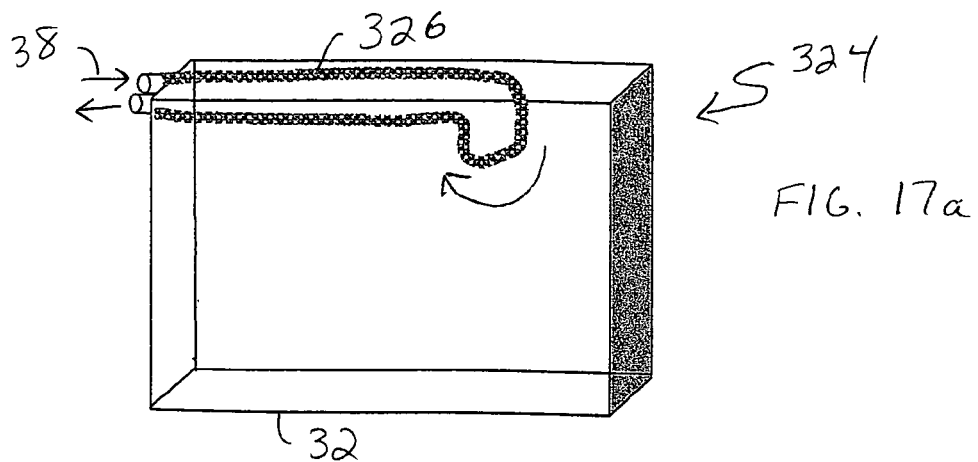
FIGS. 17a-c show schematic representations of the evaporator of FIG. 2 illustrating internal leak, or bypass, conditions.
Figure 17B:
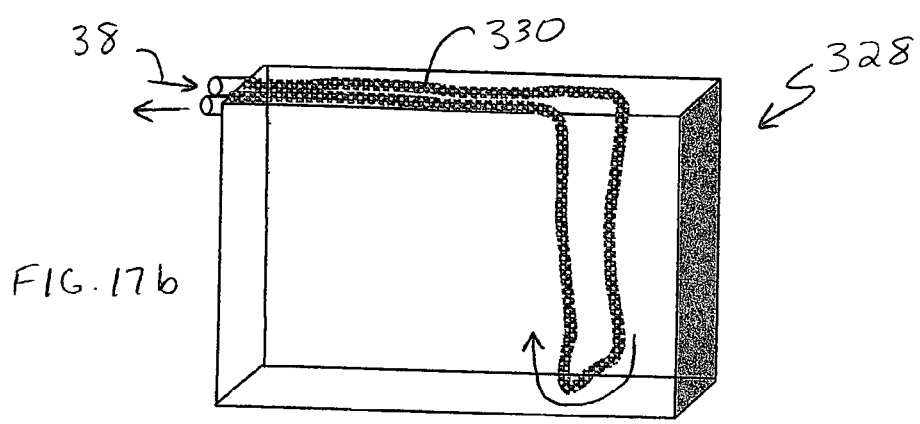
Figure 17C:
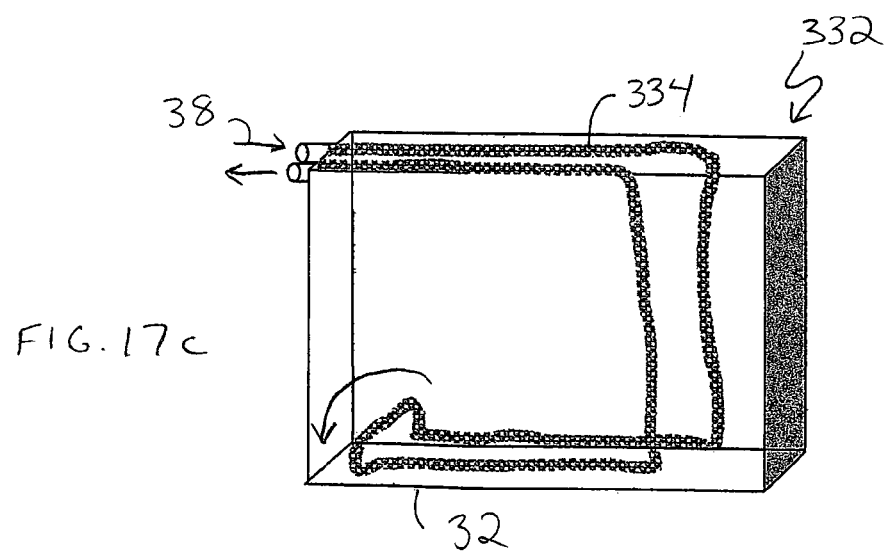

FIGS. 17a-c show schematic representations of evaporator 32 of FIG. 2 illustrating exemplary internal leaks, or bypass conditions. FIG. 17a represents a first bypass condition 324 in which leakage of refrigerant 38 occurs between inlet conduit 48 and outlet conduit 50 (FIG. 2), yielding a first flow path 326 that deviates greatly from pre-determined flow path 79 (FIG. 5). Similarly, FIG. 17b represents a second bypass condition 328 in which leakage of refrigerant 38 occurs between first intermediate conduit 52 and second intermediate conduit 54 of straight tube sheet assemblies 60 (FIG. 2), yielding a second flow path 330 that also deviates from pre-determined flow path 79 (FIG. 5). FIG. 17c represents a third bypass condition 332 in which leakage of refrigerant 38 occurs between first intermediate conduit 52 and second intermediate conduit 54 of U-turn tube sheet assemblies 62 (FIG. 2), yielding a third flow path 334 that also deviates from pre-determined flow path 79 (FIG. 5).

First, second, and third bypass conditions 324, 328, and 332 are provided for clarity of explanation. However, those skilled in the art will recognize that evaporator 32 could exhibit other internal leakage, or bypass conditions, that result in refrigerant flow paths different from those which are shown. Nevertheless, it should be readily apparent that internal leakage can cause an ineffective flow of refrigerant 38 through evaporator 32, thus decreasing the cooling performance of evaporator 32.

Figure 18A:
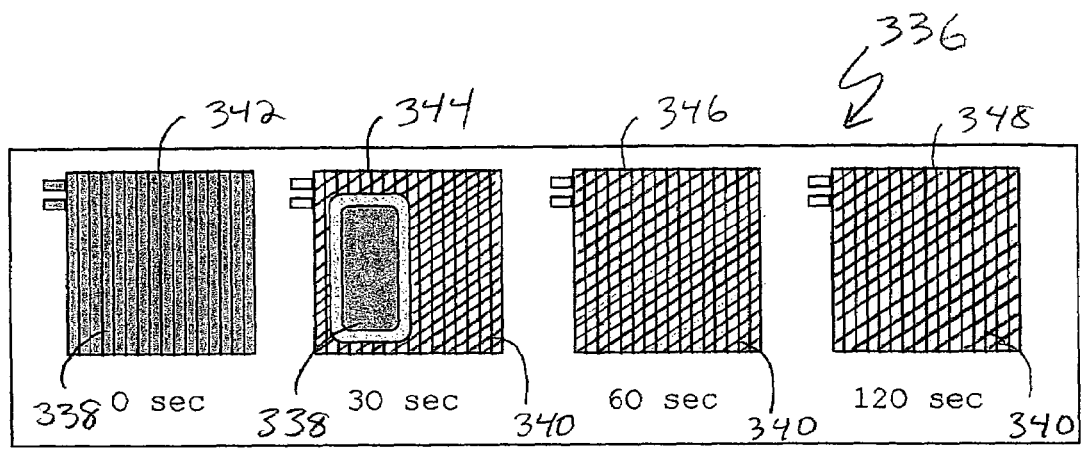
FIGS. 18a-b show schematic representations of successive thermal images for visualizing a flow of refrigerant through the evaporator of FIG. 2.
Figure 18B:
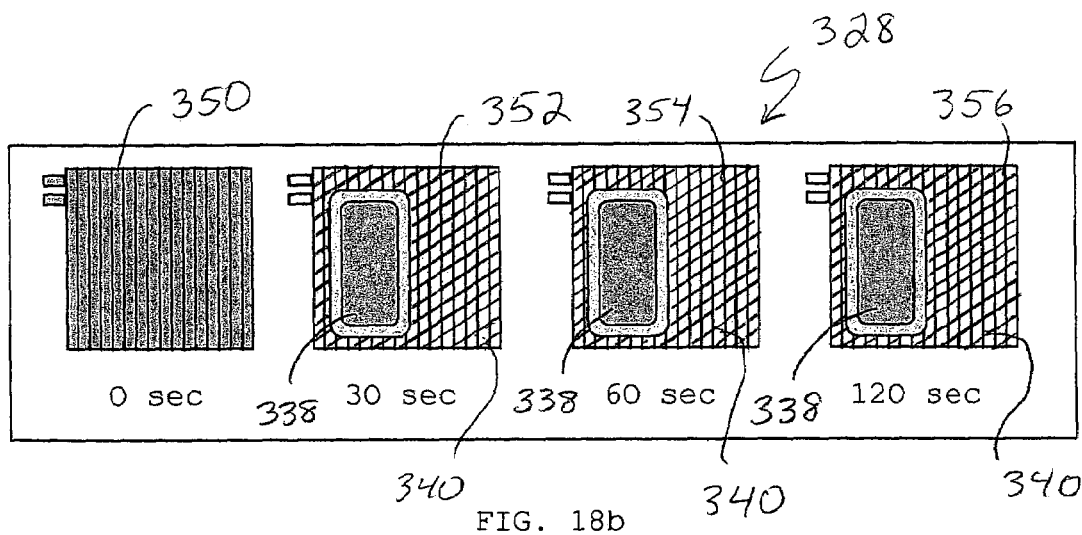

FIGS. 18a-b show schematic representations of successive thermal images for visualizing a flow of refrigerant 38 (FIG. 5) through evaporator 32 (FIG. 2). FIG. 18a represents a nominal flow condition 336, whereas, FIG. 18b represents second bypass condition 328 of FIG. 17b. In each of FIGS. 18a and 18b, grey shading enclosed by outwardly radiating rings represents a warm surface temperature 338 of evaporator 32, and diagonally oriented hatching represents a cool surface temperature 340.

The schematic representations of thermal images presented in FIGS. 18a-b are highly simplified for clarity of illustration. However, as well known to those skilled in the art, a thermal imaging camera, such as camera 168 (FIG. 7), detects the different levels of infrared energy given off by areas of different temperatures and displays these as a pattern or as gradations of color on a screen. Accordingly, actual thermal images produced by heat exchanger evaluation system 84 (FIG. 7) and displayed on monitor 100 (FIG. 7) are likely to be far more complex than what is shown. Nevertheless, the schematic representations of FIGS. 18a-b serve to further the understanding of the present invention.

Referring particularly to FIG. 18a, FIG. 18a shows a first thermal image 342 logged at test onset, i.e., zero seconds, a second thermal image 344 logged at thirty seconds, a third thermal image 346 logged at sixty seconds, and a fourth thermal image 348 logged at one hundred and twenty seconds. Under nominal flow condition 336, first thermal image 342 indicates warm surface temperature 338 across all of evaporator 32 at test onset. Second thermal image 344 reveals that at thirty seconds, refrigerant 38 has flowed into straight tube sheet assemblies 60 (FIG. 5). Cool refrigerant 38 in straight tube sheet assemblies 60 is revealed by cool surface temperature 340 on the right side of second thermal image 344, while the left side of second thermal image 344 still exhibits warm surface temperature 338. Third thermal image 346 reveals that at sixty seconds, refrigerant 38 has now also flowed into u-turn tube sheet assemblies 62. As such, third thermal image 346 shows evaporator 32 having cool surface temperature 340 across its entire surface. This trend continues in fourth thermal image 348 at one hundred and twenty seconds where evaporator 32 continues to have cool surface temperature 340 across its entire surface.

Referring now to FIG. 18b, FIG. 18b shows a first thermal image 350 logged at test onset, i.e., zero seconds, a second thermal image 352 logged at thirty seconds, a third thermal image 354 logged at sixty seconds, and a fourth thermal image 348 logged at one hundred and twenty seconds. Under second bypass condition 328, first thermal image 350 indicates warm surface temperature 338 across all of evaporator 32 at test onset. This is as expected since no refrigerant 38 has yet flowed into evaporator 38.

Second thermal image 352 reveals that at thirty seconds, refrigerant 38 has flowed into straight tube sheet assemblies 60 (FIG. 5). Cool refrigerant 38 in straight tube sheet assemblies 60 is revealed by cool surface temperature 340 on the right side of second thermal image 344, while the left side of second thermal image still exhibits warm surface temperature 338. Accordingly, first and second thermal images 350 and 352, respectively, correspond with first and second thermal images 342 and 344 (FIG. 18a) of nominal flow condition 336.

However, third thermal image 354 reveals that at sixty seconds, refrigerant 38 has not flown into u-turn tube sheet assemblies 62, as it would have under nominal flow condition 336 (FIG. 18a). Rather, there is little difference between third thermal image 354 and second thermal image 352. This trend continues in fourth thermal image 356 at one hundred and twenty seconds where there is little difference between fourth thermal image 356 and second thermal image 352.

Consequently, third and fourth thermal images clearly show a deviation of refrigerant 38 flow from pre-determined flow path 79. Moreover, the thermal images, detecting surface temperature variations, can be rapidly acquired for a single flow test in less than approximately two minutes. Upon review of the thermal images, an operator can reject such a heat exchanger for use in an air conditioning system, such as refrigeration system 20 (FIG. 1). However, if review of the thermal images reveals nominal flow condition 336 for a particular heat exchanger, the subsequent pump down and post-evacuation procedures, enable the heat exchanger to be sufficiently cleaned so that evaporator 32 can be prepared for eventual distribution.

In summary, the present invention teaches of a system and method for evaluating a flow of fluid through a heat exchanger. The system includes a thermal imaging camera directed toward the heat exchanger that provides thermal images of fluid flow through the heat exchanger. The thermal images enable visual inspection of the heat exchanger so as to detect internal leakage. The system and method enable the rapid, cost effective, and non-destructive evaluation of a heat exchanger for both external and internal leakage, thus decreasing the probability of defective heat exchangers entering the market.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that there is a great variation in the order in which many of the tasks described herein may be performed.

What is claimed is:

1. A method for evaluating a flow of a fluid through a heat exchanger comprising:
    inspecting said heat exchanger for a leak between said heat exchanger and an ambient environment, said inspecting operation comprising:
        placing a vacuum pump in fluid communication with said heat exchanger;
        utilizing said vacuum pump to pull a vacuum on said heat exchanger; and
        measuring a fluid pressure between said heat exchanger and said vacuum pump, wherein said absence of said leak is revealed when said fluid pressure is less than a low pressure threshold;
    when an absence of said leak is revealed, said method further comprises:
    routing said fluid through said heat exchanger;
    detecting a surface temperature across said heat exchanger in response to a flow of said fluid through said heat exchanger; and
    determining an efficacy of said flow in response to said surface temperature.

2. A method as claimed in claim 1 wherein said routing activity comprises:
    interconnecting said heat exchanger in a fluid loop for said fluid, said fluid loop including a condenser; and
    enabling delivery of said fluid from said condenser to said heat exchanger.

3. A method as claimed in claim 2 wherein said heat exchanger and said condenser are in spaced-relation, and said method further comprises utilizing a condenser fan of said condenser to draw ambient air across said heat exchanger toward said condenser.

4. A method as claimed in claim 2 further comprising filtering said fluid prior to said routing activity.

5. A method as claimed in claim 1 wherein when a presence of said leak is revealed, said method further comprises:
    reporting said leak; and
    suspending said routing, detecting, and determining activities.

6. A method as claimed in claim 1 wherein said detecting activity comprises:
    utilizing a thermal imaging system to detect a variation of said surface temperature across said heat exchanger; and
    presenting thermal images responsive to said variation of said surface temperature on a monitor.

7. A method as claimed in claim 1 wherein said heat exchanger has a pre-determined flow path for said fluid, and said determining operation ascertains whether said flow of said fluid deviates from said pre-determined flow path.

8. A method as claimed in claim 7 wherein said heat exchanger is an evaporator for an air conditioning system, said fluid is refrigerant, and said method further comprises rejecting said evaporator for use in said air conditioning system when said flow of said refrigerant deviates from said pre-determined flow path.

* * * * *